(12) United States Patent
Hasumi

(10) Patent No.: US 7,241,028 B2
(45) Date of Patent: Jul. 10, 2007

(54) LIGHTING APPARATUS FOR VEHICLE

(75) Inventor: Hirofumi Hasumi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 159 days.

(21) Appl. No.: 11/117,720

(22) Filed: Apr. 29, 2005

(65) Prior Publication Data

US 2005/0243566 A1    Nov. 3, 2005

(30) Foreign Application Priority Data

Apr. 30, 2004    (JP)    ............. 2004-136678

(51) Int. Cl.
*B60Q 1/00*    (2006.01)
(52) U.S. Cl. ............... 362/276; 362/464; 315/82
(58) Field of Classification Search ............ 315/82; 362/43, 276, 464
See application file for complete search history.

(56) References Cited

U.S. PATENT DOCUMENTS 6,293,686 B1    9/2001    Hayami et al.
6,481,876 B2    11/2002    Hayami et al.

FOREIGN PATENT DOCUMENTS

| JP | 2000-238576 A | 9/2000 |
|---|---|---|
| JP | 2001-213227 A | 8/2001 |
| JP | 2001-277936 A | 10/2001 |
| JP | 2003-159986 A | 6/2003 |

*Primary Examiner*—David Vu
(74) *Attorney, Agent, or Firm*—Foley & Lardner LLP

(57) ABSTRACT

A lighting apparatus for a vehicle includes at least one additional lamp provided on a left side of a front of the vehicle; at least one additional lamp provided on a right side of the front of the vehicle; a steering-angle sensor that detects a steering angle and a steering direction of a steering wheel, and outputs a steering-angle signal and a steering-direction signal; and a control device that controls the additional lamps based on the steering-angle signal and the steering-direction signal.

6 Claims, 11 Drawing Sheets

LIGHTING APPARATUS FOR VEHICLE

CROSS-REFERENCE TO RELATED APPLICATIONS

The present document incorporates by reference the entire contents of Japanese priority document, 2004-136678 filed in Japan on Apr. 30, 2004.

BACKGROUND OF THE INVENTION

1) Field of the Invention

The present invention relates to a lighting apparatus (lighting system) for a vehicle to turn on or dim one or a plurality of left-side additional lamps, or that turns on or dims one or a plurality of right-side additional lamps, by being interlocked with steering, when a vehicle is traveling along a curving road. More particularly, the present invention relates to a vehicle lighting apparatus in which if a steering angle of a steering wheel becomes not more than a given steering angle causing forced complete turn-off of light while one or a plurality of left-side additional lamps or one or a plurality of right-side additional lamps is dimming, the relevant additional lamp during dimming is forcefully and completely turned off. In this specification and the scope of claims, a term of "to dim (light)" indicates that the amount of light of the additional lamp in its on-state is gradually reduced from 100% towards 0% over a given time (e.g., about one second). That is, it indicates that the light is dimmed down towards turning off. Furthermore, a term of "road surface and the like" indicates the surface of a road, persons on the surface of the road (pedestrians and so on), and objects (guardrails, other vehicles, road signs, and buildings).

2) Description of the Related Art

Lighting apparatuses for vehicles as follows have been provided (see, for example, "Vehicle lighting apparatus" described in Japanese Patent Application Laid-Open No. 2003-159986 (hereinafter, "Related technology 1")). Like Adaptive Front lighting System (AFS), the lighting apparatuses for vehicles turn on or dim one or a plurality of left-side additional lamps, or turn on or dim one or a plurality of right-side additional lamps, by being interlocked with turning of a steering wheel, when the vehicle is traveling along a curving road. The "vehicle lighting apparatus" described in Related technology 1 is explained below. It is noted that reference signs inside parentheses below correspond to those in the Related technology 1. The vehicle lighting apparatus includes a left additional lighting lamp (5) provided on the left side of the front of the vehicle, and a right additional lighting lamp. (4) on a right side therein. The vehicle lighting apparatus also includes a steering wheel steering angle detector (8) that outputs a detection signal in response to the operation of the steering wheel. The vehicle lighting apparatus further includes an arithmetic controller (7) that outputs a turn-on signal to the left additional lighting lamp (5) or to the right additional lighting lamp (4) when the steering angle of the steering wheel exceeds a reference steering angle for determination on the start of turning on light, and that outputs a light dimming signal to the left additional lighting lamp (5) or to the right additional lighting lamp (4) when the steering angle is below a reference steering angle for determination on the start of dimming the light.

The processes of the vehicle lighting apparatus are explained below. At first, the arithmetic controller (7) outputs the turn-on signal to the left additional lighting lamp (5) or the right additional lighting lamp (4) on the side of a steering direction when the steering angle of the steering wheel exceeds the reference steering angle for determination on the start of turning on the light (e.g., 40°), based on the detection signal from the steering wheel steering angle detector (8), and turns on the left additional lighting lamp (5) or the right additional lighting lamp (4). Furthermore, the arithmetic controller (7) outputs the light dimming signal to the left additional lighting lamp (5) or the right additional lighting lamp (4) on the side of a steering direction when the steering angle is below the reference steering angle for determination on the start of dimming the light (e.g., near 0°), based on the detection signal from the steering wheel steering angle detector (8). And then, the arithmetic controller (7) causes the left additional-lighting lamp (5) in its on-state or the right additional lighting lamp (4) therein to dim. In other words, the amount of light of the left additional lighting lamp (5) in its on-state or of the right additional lighting lamp (4) therein is gradually reduced from 100% towards 0% over the given time (e.g., about one second).

In the vehicle lighting apparatus, the left additional lighting lamp (5) in its on-state or the right additional lighting lamp (4) therein is gradually dimming. Therefore, a driver is not given an uncomfortable feeling due to instantaneous turning off of the left additional lighting lamp (5) or of the right additional lighting lamp (4) in its on-state.

If returning the steering wheel when the vehicle is traveling along a curving road such as a road with an S-shaped curve, the driver generally looks at the curving road in the direction of returning the steering wheel.

In the vehicle lighting apparatus, however, during the time from starting of dimming the light to passage of a given time, the left additional lighting lamp (5) or the right additional lighting lamp (4) is not in its complete off state (in a state where the light amount is 0%) but in a light dimming state (in a state where the light amount is gradually reduced from 100% towards 0%), the light dimming state being still in its on-state. Therefore, in the vehicle lighting apparatus, when the driver returns the steering wheel during driving along the curving road, even though the driver's eye point directs toward the curving road in the direction in which the steering wheel is returned, the additional lighting lamp, i.e., the left additional lighting lamp (5) or the right additional lighting lamp (4) on the side opposite to the direction in which the steering wheel is returned, is in the light dimming state that is still in its on-state. As a result of this, the vehicle lighting apparatus may sometimes give the uncomfortable feeling or annoyingness to the driver due to inconsistency between a timing of movement of the driver's eye point and a timing of completely turning off the left additional lighting lamp (5) or the right additional lighting lamp (4).

As a vehicle lighting apparatus that causes one or a plurality of left-side additional lamps or one or a plurality of right-side additional lamps to dim, there is a vehicle lighting apparatus described in Japanese Patent Application Laid-Open No. 2001-213227 (hereinafter, "Related technology 2"), in addition to the Related technology 1.

SUMMARY OF THE INVENTION

It is an object of the present invention to solve at least the above problems in the conventional technology.

A lighting apparatus for a vehicle includes at least one additional lamp provided on a left side of a front of the vehicle; at least one additional lamp provided on a right side of the front of the vehicle; a steering-angle sensor that detects a steering angle and a steering direction of a steering wheel, and outputs a steering-angle signal and a steering-direction signal; and a control device that controls the additional lamps based on the steering-angle signal and the steering-direction signal. When the steering angle is equal to or more than a predetermined turn-on angle, the control device outputs a turn-on signal to the additional lamp on a side of the steering direction; when the steering angle satisfies a predetermined light-dimming condition, the control device outputs a light dimming signal to the additional lamp that is turned on; and when the steering angle is equal to or less than a predetermined forced-complete-turn-off steering-angle, the control device outputs a forced-complete-turn-off signal to the additional lamp that is dimmed.

The other objects, features, and advantages of the present invention are specifically set forth in or will become apparent from the following detailed description of the invention when read in conjunction with the accompanying drawings.

DETAILED DESCRIPTION

Exemplary embodiments of a vehicle lighting apparatus according to the present invention are explained in detail below with reference to the accompanying drawings. It should be noted that the present invention is not limited by the embodiments.

Figure 1:
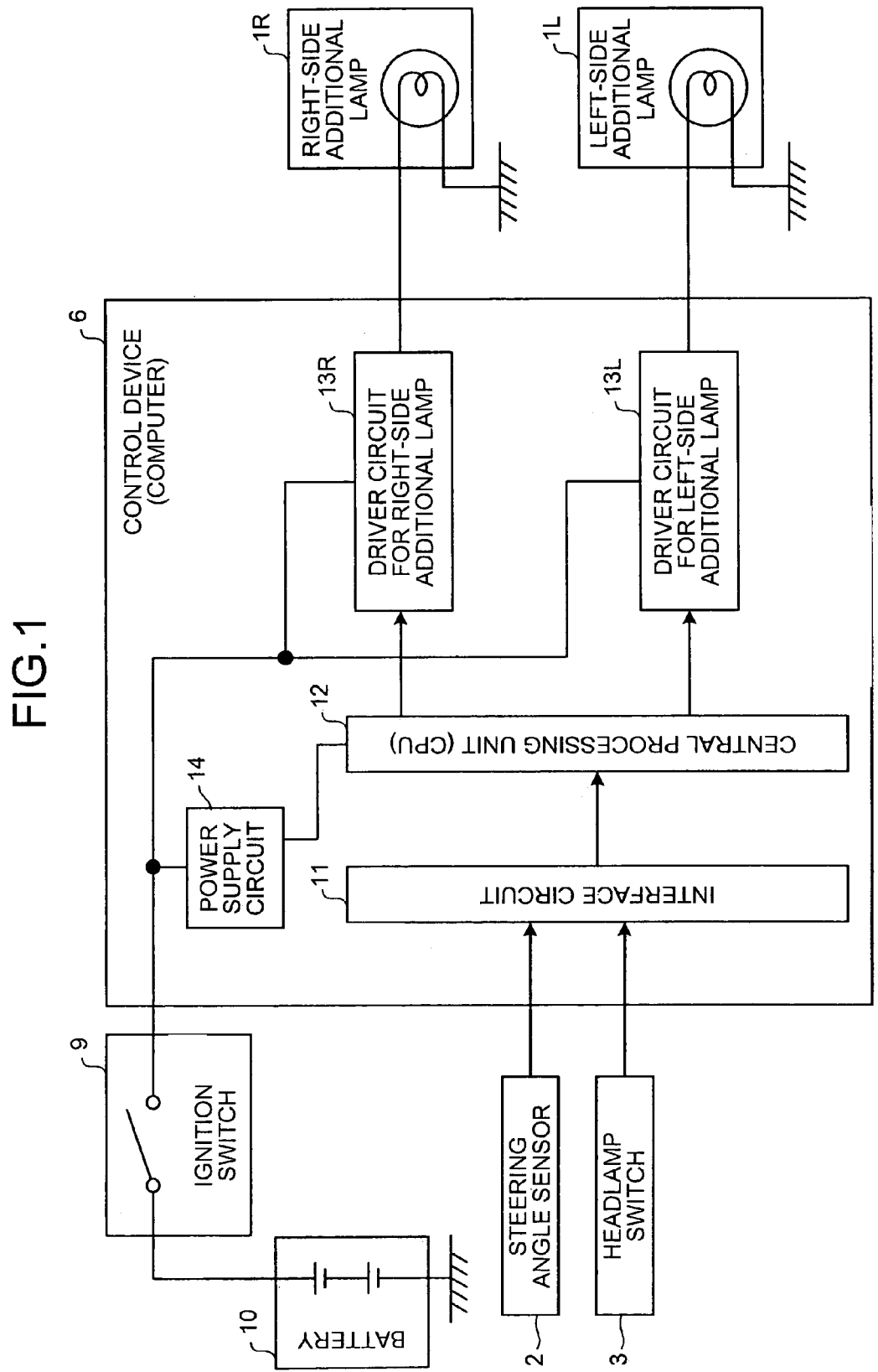
FIG. 1 is a block diagram of a configuration of a vehicle lighting apparatus according to a first embodiment of the present invention.

FIG. 1 to FIG. 5 indicate a vehicle lighting apparatus according to a first embodiment of the present invention. A configuration of the vehicle lighting apparatus according to the first embodiment is explained below. As shown in FIG. 1, the vehicle lighting apparatus according to the first embodiment includes-one left-side additional lamp 1L, one right-side additional lamp 1R, a steering-angle sensor 2, a headlamp switch 3, and a control device 6 (control circuit, and electronic control unit (ECU)).

Figure 2:
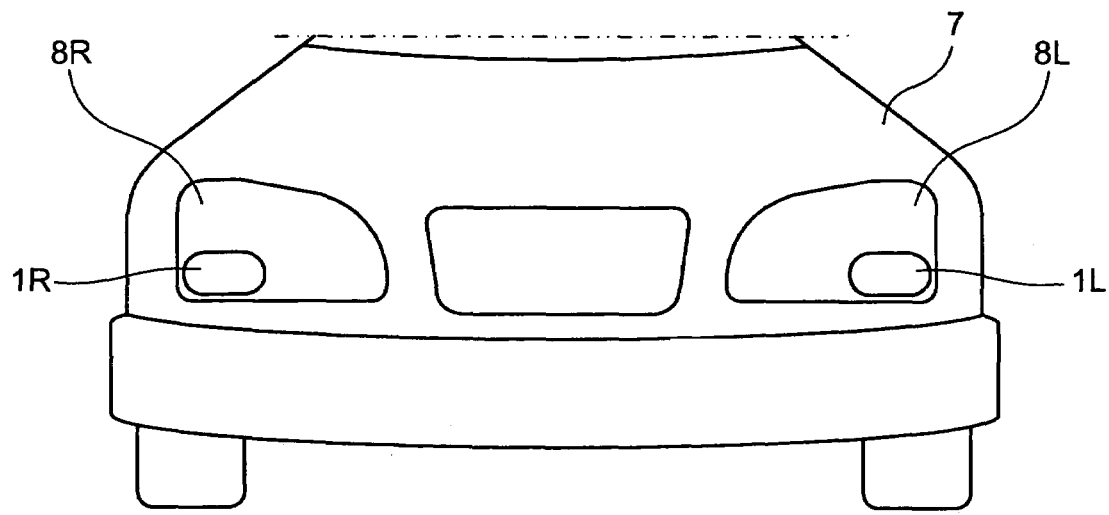
FIG. 2 is a partial front view of a vehicle that incorporates the vehicle lighting apparatus according to the first embodiment.
Figure 3:
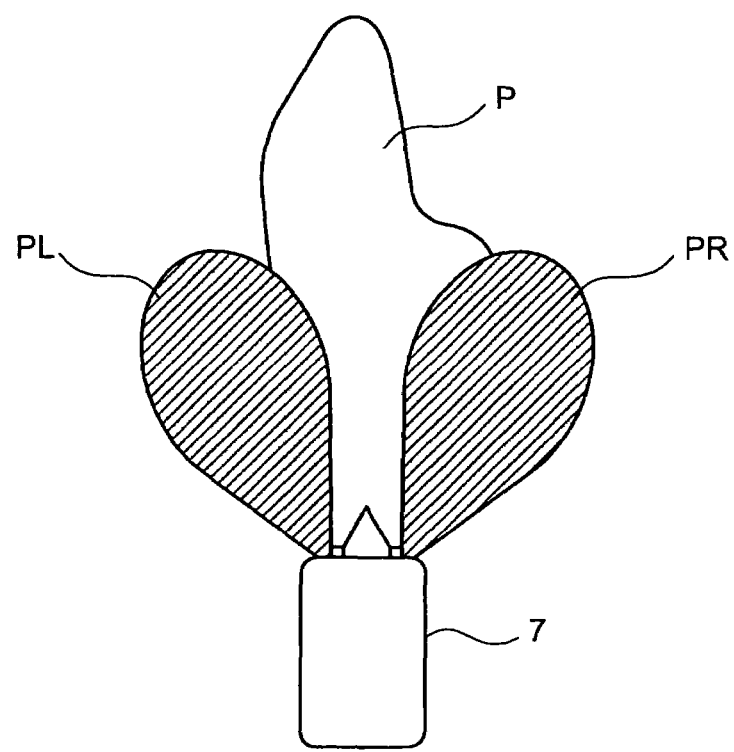
FIG. 3 is a flat diagram for explaining a light distribution pattern of a headlamp, a light distribution pattern of a left-side additional lamp, and a light distribution pattern of a right-side additional lamp according to the first embodiment.

As shown in FIG. 2, the left-side additional lamp 1L and the right-side additional lamp 1R are additionally provided on the left side and the right side of the front of a vehicle 7, respectively. A left-side headlamp 8L and a right-side headlamp 8R are mounted on the left side and the right side of the front of the vehicle 7, respectively. As shown in FIG. 3, the left-side headlamp 8L and the right-side headlamp 8R illuminate a road surface and the like ahead of the vehicle 7 with lights having a given light distribution pattern P. The left-side additional lamp 1L illuminates the road surface and the like, with light having a given light distribution pattern PL, on the left side of the light distribution pattern P illuminated by the headlamp 8L and the headlamp 8R. The right-side additional lamp 1R illuminates the road surface and the like, with light having a given light distribution pattern PR, on the right side of the light distribution pattern P illuminated by the headlamp 8L and the headlamp 8R.

As shown in FIG. 1, the left-side additional lamp 1L and the right-side additional lamp 1R are connected to an ignition switch 9 and a battery 10 through the control device 6. The left-side additional lamp 1L and the right-side additional lamp 1R use, as a light source, for example, a discharge lamp (so-called a high-pressure metal vapor discharge lamp such as a metal halide lamp, and a high-intensity discharge lamp (HID), etc.), a halogen lamp, an incandescent lamp, and light emitting diode (LED). The left-side headlamp 8L and the right-side headlamp 8R are also connected to the ignition switch 9 and the battery 10 through the control device 6, although the connection is not shown in FIG. 1.

The steering-angle sensor 2 detects a steering angle of the steering wheel (not shown) and a direction in which the steering wheel is turned (hereinafter, "a steering direction"), and outputs a steering-angle signal and a steering-direction signal to the control device 6. More specifically, when the vehicle 7 is traveling along a curving road (a road with a curve to the left, a road with a curve to the right, and a road with an S-shaped curve) or when the vehicle 7 turns to the left or turns to the right at an intersection, the steering-angle sensor 2 detects a steering angle (a rotation angle) of the steering wheel and a steering direction (a direction of rotation) in which a driver turns the vehicle 7. And then, the steering-angle sensor 2 outputs a steering-angle signal and a steering-direction signal to the control device 6. The steering-angle signal and the steering-direction signal can be obtained as specific numerical data through networking between the steering-angle sensor 2 and the control device 6 mounted on the vehicle. As specific numerical data, for example, if the steering wheel is turned to the right by 10 degrees, numerical data of +10° is obtained. And, if the steering wheel is turned to the left by 10 degrees, numerical data of −10° is obtained. As more specific numerical data, for example, if the steering wheel is turned to the right by 10 degrees, numerical data of "990" with respect to a neutral numerical value of "1000" is obtained. While if the steering wheel is turned to the left by 10 degrees, numerical data of "1010" with respect to the neutral numerical value of "1000" is obtained. On the other hand, the steering-angle signal and the steering-direction signal are obtained as electrical signals that are output to the control device 6 from the steering-angle sensor 2 (e.g., optical sensor) mounted on the vehicle.

The headlamp switch 3 is switched on and off by the driver to turn on and off the headlamps 8L and 8R. When it is on, the headlamp switch 3 outputs an on-signal (e.g., high-level signal) to the control device 6, and outputs an off-signal (e.g., low-level signal) thereto when it is off.

The control device 6 includes an interface circuit 11 that serves as an external signal input device connected with the steering-angle sensor 2 and the headlamp switch 3. The control device 6 also includes a central processing unit (CPU) 12 (arithmetic controller), a left-side additional-lamp driver circuit 13L (a drive unit for the left-side additional-lamp) connected with the left-side additional lamp 1L, a right-side additional-lamp driver circuit 13R (a drive unit for the right-side additional-lamp) connected with the right-side additional lamp 1R, and a power supply circuit 14. As the left-side additional-lamp driver circuit 13L and the right-side additional-lamp driver circuit 13R, for example, a relay or a semiconductor switch (a field-effect transistor (FET) or a transistor) is used.

In the control device 6, the steering-angle signal and the steering-direction signal are input to the interface circuit 11 from the steering-angle sensor 2, and the on-signal and the off-signal are input thereto from the headlamp switch 3. The CPU 12 determines whether the left-side additional lamp 1L or the right-side additional lamp 1R is to be turned on or off based on the signals input. Based on the results of determination, the CPU 12 turns on or off the left-side additional lamp 1L or the right-side additional lamp 1R through the left-side additional-lamp driver circuit 13L or the right-side additional-lamp driver circuit 13R, respectively. In the control device 6, a computer mounted on the vehicle, for example, a computer for a car navigation (navigation system) or a computer for a control circuit and an ECU is used.

The interface circuit 11 receives the steering-angle signal and the steering-direction signal from the steering-angle sensor 2, receives the on-signal and the off-signal from the headlamp switch 3, processes these signals received to obtain signals capable of being handled by the CPU 12, and outputs the signals processed to the CPU 12.

Figure 4:
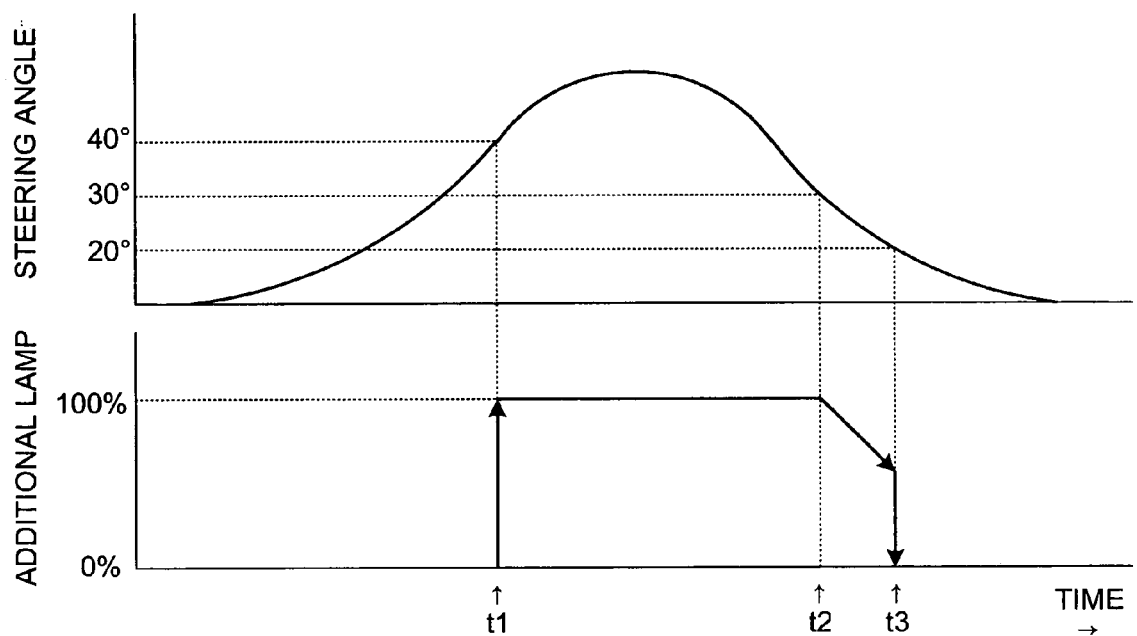
FIG. 4 is a diagram for explaining a relative relationship between a steering angle of a steering wheel and turning on/off of the left-side additional lamp or the right-side additional lamp according to the first embodiment.
Figure 5:
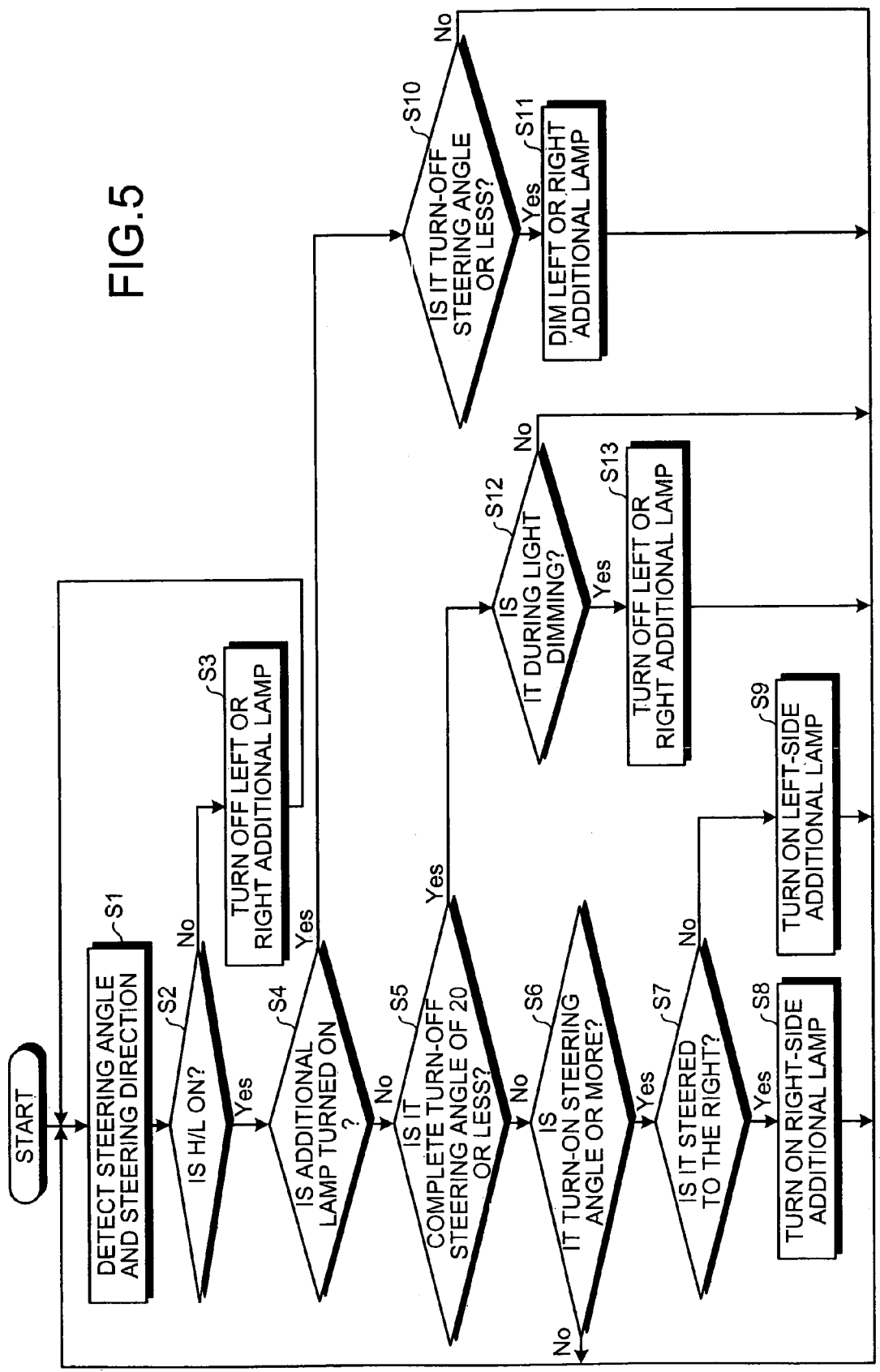
FIG. 5 is a flowchart of processes (procedure of processes at steps) of a control unit (central processing unit (CPU)) according to the first embodiment.

The CPU 12 sequentially performs processes at steps in a flowchart of FIG. 5 based on the signals processed output from the interface circuit 11. Furthermore, the CPU 12 outputs a turn-on signal, a light dimming signal, or a forced-complete-turn-off signal to the left-side additional-lamp driver circuit 13L or the right-side additional-lamp driver circuit 13R, based on steering angle-turning on/off characteristics as shown in FIG. 4. The CPU 12 may also be integrated into one unit with the interface circuit 11.

The left-side additional-lamp driver circuit 13L or the right-side additional-lamp driver circuit 13R controls the processes for turning on, dimming, and forcefully and completely turning off the left-side additional lamp 1L or the right-side additional lamp 1R, based on the turn-on signal, the light dimming signal, or the forced-complete-turn-off signal from the CPU 12. Thus, the turn-on, the light dimming, and the forced complete turn-off of the left-side additional lamp 1L or the right-side additional lamp 1R are controlled.

FIG. 4 is a diagram for explaining a relative relationship between a steering angle of a steering wheel and turning on/off of the left-side additional lamp 1L or the right-side additional lamp 1R. The upper part of FIG. 4 is a graph representing change with time in a steering angle of the steering wheel (an angle of leftward rotation or rightward rotation with respect to 0 degree of the steering wheel (neutral position, the front)). The vertical axis of the graph represents a steering angle (steering angle of the steering wheel), and the horizontal axis thereof represents time. The lower part of FIG. 4 is a graph representing, on a time axis, timings of turning on, dimming, and forcefully and completely turning off the left-side additional lamp 1L or the right-side additional lamp 1R. The vertical axis of the graph represents an additional lamp (on-state and off-state of the left-side additional lamp 1L and the right-side additional lamp 1R), and the horizontal axis thereof represents time.

In the control device 6 (CPU 12), the relative relationship between the steering angle of the steering wheel and the turning on/off of the left-side additional lamp 1L or the right-side additional lamp 1R is as follows. That is, when the vehicle 7 is going into a curving road, the driver starts turning the steering wheel, and the steering angle of the steering wheel reaches a given steering angle causing turn-on of light (or a turn-on steering angle) or more (see "t1" in the upper part of FIG. 4). Then, the turn-on signal is output to the driver circuit 13L for the left-side additional lamp 1L or the driver circuit 13R for the right-side additional lamp 1R on the side of the steering direction of the steering wheel, and the left-side additional lamp 1L or the right-side additional lamp 1R turns on (see the upward arrow "↑" indicating movement from 0% to 100% at t1 in the lower part of FIG. 4). Although the turn-on steering angle is fixed and an arbitrary value irrespective of a travel speed of the vehicle 7 (hereinafter, "vehicle speed"), it is set to, for example, 40 degrees in this example. If a road is a curving road that is almost straight, for example, if it is a curving road having a curve radius (curve radius of a central line on a curve of a roadway) of 500 meters or more, it is better not to turn on the light. Therefore, the turn-on steering angle that is a condition for turning on the left-side additional lamp 1L and the right-side additional lamp 1R is set to a steering angle that matches the condition of the curving road.

The driver starts returning the steering wheel in the curving road, and the steering angle of the steering wheel reaches a given steering angle causing light dimming (or a light dimming steering angle) or less (see "t2" in the upper part of FIG. 4). Then, the light dimming signal is output to the driver circuit 13L for the left-side additional lamp 1L or the driver circuit 13R for the right-side additional lamp 1R that is in its on-state, and the left-side additional lamp 1L or the right-side additional lamp 1R starts dimming (see the right downward slanting arrow starting from 100% at t2 in the lower part of FIG. 4). Although the light dimming steering angle is fixed and an arbitrary value irrespective of the vehicle speed, it is set to, for example, 30 degrees in this example. The control of dimming the light may be performed by using a pulse width modulation (PWM) system or a voltage-controlled system (see Related technology 1 and Related technology 2).

Furthermore, the driver returns the steering wheel, and the steering angle of the steering wheel reaches a given steering angle causing forced complete turn-off of light (or a forced-complete-turn-off steering angle) or less (see "t3" in the upper part of FIG. 4). Then, the forced-complete-turn-off signal is output to the driver circuit 13L for the left-side additional lamp 1L or the driver circuit 13R for the right-side additional lamp 1R that is in its light dimming state, and the left-side additional lamp 1L or the right-side additional lamp 1R is forcefully and completely turned off (see the downward arrow "↓" ended at 0% at t3 in the lower part of FIG. 4). Although the forced-complete-turn-off steering angle is fixed and an arbitrary value irrespective of the vehicle speed, it is set to, for example, 20 degrees in this example.

The vehicle lighting apparatus according to the first embodiment is configured in the above manner, and the processes of the vehicle lighting apparatus are explained below.

At first, the ignition switch 9 is turned on. Then, in the control device 6, power from the power supply circuit 14 to the CPU 12 is turned on, and the CPU 12 starts up. That is, the CPU 12 sequentially performs processes at steps in the flowchart of FIG. 5. The procedure (processes) of the steps by the CPU 12 is explained below with reference to the flowchart of FIG. 5.

The CPU 12 is caused to start the processes. Then, the steering-angle sensor 2 detects a steering angle and a steering direction of the steering wheel, and outputs detection signals (steering-angle signal and steering-direction signal) to the control device 6. The headlamp switch 3 outputs an on-signal or an off-signal to the control device 6. The CPU 12 receives the detection signals from the steering-angle sensor 2 and receives the on-signal or the off-signal from the headlamp switch 3 through the interface circuit 11 (Detect a steering angle and a steering direction: step S1).

Next, the CPU 12 determines whether the headlamp switch (H/L) 3 is on or off (Is H/L on?: step S2). If the headlamp switch 3 is off, the CPU 12 outputs the turn-off signal to the driver circuit 13L for the left-side additional lamp 1L or the driver circuit 13R for the right-side additional lamp 1R. As a result, the left-side additional lamp 1L or the right-side additional lamp 1R enters an off-state (Turn off the left- or the right additional lamp: step S3). Thereafter, the CPU 12 returns to step S1.

At step S2, if the headlamp switch 3 is on, the CPU 12 determines whether the left-side additional lamp 1L or the right-side additional lamp 1R is in its on-state (Is additional lamp turned on?: step S4). If the left-side additional lamp 1L or the right-side additional lamp 1R is not in its on-state, the CPU 12 determines whether the steering angle of the steering wheel is the forced-complete-turn-off steering angle or less (Is it complete turn-off steering angle of 20° or less?: step S5). If the steering angle is the forced-complete-turn-off steering angle or more, the CPU 12 determines whether the steering angle of the steering wheel is the turn-on steering angle or more (Is it the turn-on steering angle or more?: step S6). If the steering angle is the turn-on steering angle or less, the CPU 12 returns to step S1.

At step S6, if the steering angle is the turn-on steering angle or more (see t1 in the upper part of FIG. 4), the CPU 12 determines which direction the steering wheel is turned in (Is it steered to the right?: step S7). If the steering direction of the steering wheel is rightward (clockwise), the CPU 12 outputs the turn-on signal to the driver circuit 13R for the right-side additional lamp 1R. As a result, the right-side additional lamp 1R enters the turn-on state (see the upward arrow "↑" indicating movement from 0% to 100% at t1 in the lower part of FIG. 4) (Turn on the right-side additional lamp: step S8). Thereafter, the CPU 12 returns to step S1.

At step S7, if the steering direction of the steering wheel is leftward (counterclockwise), the CPU 12 outputs the turn-on signal to the driver circuit 13L for the left-side additional lamp 1L. As a result, the left-side additional lamp 1L enters the turn-on state (see also the upward arrow "↑" indicating movement from 0% to 100% at t1 in the lower part of FIG. 4) (Turn on the left-side additional lamp: step S9). Thereafter, the CPU 12 returns to step S1.

At step S4, if the left-side additional lamp 1L or the right-side additional lamp 1R is in its on-state, the CPU 12 determines whether the steering angle of the steering wheel is the light dimming steering angle or less (Is it light dimming steering angle or less?: step S10). If the steering angle is the light dimming steering angle or more, then the CPU 12 returns to step S1

At step S10, if the steering angle is the light dimming steering angle or less (see t2 in the upper part of FIG. 4), the CPU 12 outputs the light dimming signal to the driver circuit 13L for the left-side additional lamp 1L or the driver circuit 13R for the right-side additional lamp 1R that is in its on-state. Then, the left-side additional lamp 1L or the right-side additional lamp 1R in its on-state starts dimming (see the right downward slanting arrow starting from 100% at t2 in the lower part of FIG. 4). As a result, the left-side additional lamp 1L or the right-side additional lamp 1R is in its light dimming state (Turn off the left or the right additional lamp: step S11). Thereafter, the CPU 12 returns to step S1.

At step S5, if the steering angle reaches the forced-complete-turn-off steering angle or less (see t3 in the upper part of FIG. 4), the CPU 12 determines whether the left-side additional lamp 1L or the right-side additional lamp 1R is in its light dimming state (Is it during light dimming?: step S12). If the left-side additional lamp 1L or the right-side additional lamp 1R is not in its light dimming state, then the CPU 12 returns to step S1.

At step S12, if the left-side additional lamp 1L or the right-side additional lamp 1R is in its light dimming state, the CPU 12 outputs the forced-complete-turn-off signal to the driver circuit 13L for the left-side additional lamp 1L or the driver circuit 13R for the right additional lamp 1R that is in its light dimming state. As a result, the left-side additional lamp 1L or the right-side additional lamp 1R in its light dimming state enters a forced complete turn-off state (see the downward arrow ended at 0% at t3 in the lower part of FIG. 4) (Turn off the left or the right additional lamp: step S13). Thereafter, the CPU 12 returns to step S1.

The configuration and the processes of the vehicle lighting apparatus according to the first embodiment are provided in the above manner, and effects of the vehicle lighting apparatus according to the first embodiment are explained below.

In the vehicle lighting apparatus according to the first embodiment, if the driver returns the steering wheel when the vehicle 7 is traveling along a curving road, and if the steering angle of the steering wheel becomes the light dimming steering angle or less, the left-side additional lamp 1L or the right-side additional lamp 1R in its on-state starts dimming. Furthermore, if the steering angle becomes the forced-complete-turn-off steering angle or less, the left-side additional lamp 1L or the right-side additional lamp 1R in its light dimming state completely turns off. Therefore, in the vehicle lighting apparatus according to the first embodiment, when the eye point of the driver directs toward the curving road in the direction in which the steering wheel is returned during traveling along the curving road, the left-side additional lamp 1L or the right-side additional lamp 1R completely turns off in almost all cases. Therefore, neither uncomfortable feeling nor annoyingness is given to the driver. In the vehicle lighting apparatus according to the first embodiment, the timing of movement of the driver's eye point is consistent with the timing of completely turning off the left-side additional lamp 1L or the right-side additional lamp 1R in its light dimming state, and therefore, neither uncomfortable feeling nor annoyingness is given to the driver, which allows contribution to traffic safety.

Figure 6:
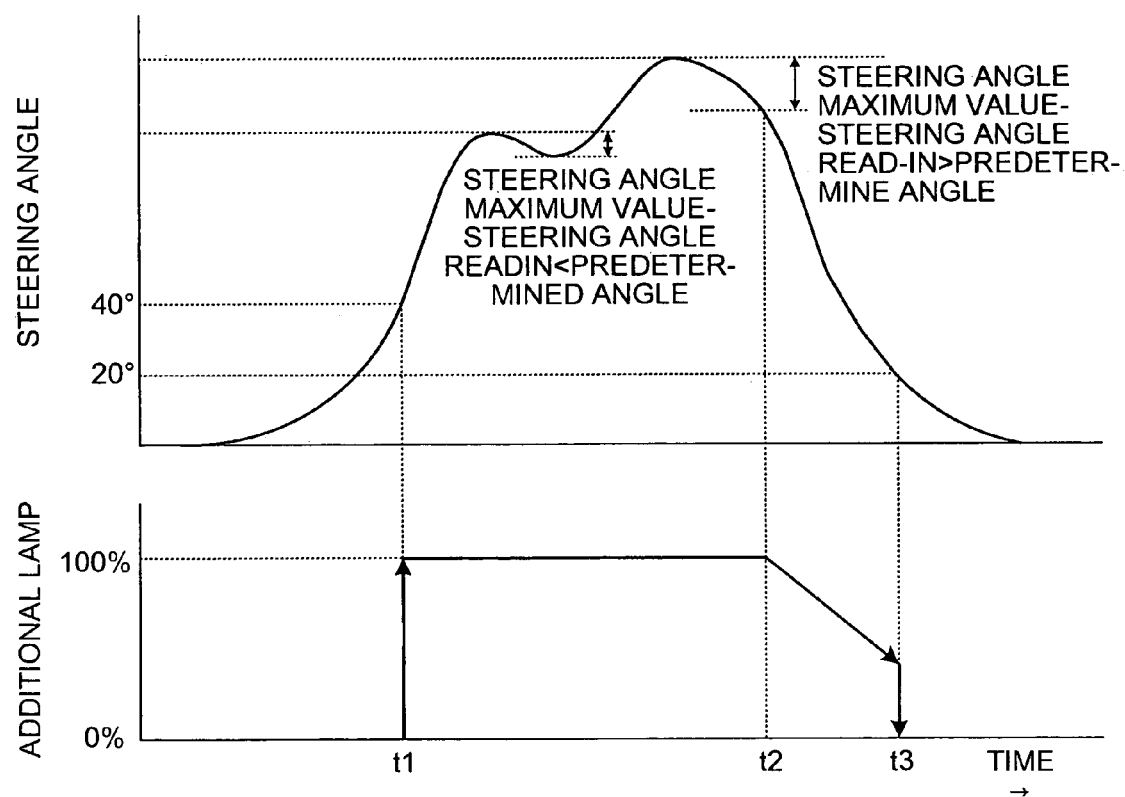
FIG. 6 is a diagram for explaining a relative relationship between a steering angle of a steering wheel and turning on/off of the left-side additional lamp or the right-side additional lamp in a vehicle lighting apparatus according to a second embodiment of the present invention.

FIG. 6 indicates a vehicle lighting apparatus according to a second embodiment of the present invention. The vehicle lighting apparatus according to the second embodiment is explained below. In FIG. 6, the same reference signs as these in FIG. 1 to FIG. 5 represent the same parts.

FIG. 6 is a diagram for explaining a relative relationship between a steering angle of the steering wheel and turning on/off of the left-side additional lamp 1L or the right-side additional lamp 1R. Similarly to the upper part of FIG. 4, the upper part of FIG. 6 is a graph representing change with time in a steering angle of the steering wheel. The vertical axis of the graph represents a steering angle, and the horizontal axis thereof represents time. Likewise, the lower part of FIG. 6 is a graph representing, on a time axis, timings of turning on, dimming, and forcefully and completely turning off the left-side additional lamp 1L or the right-side additional lamp 1R. The vertical axis of the graph represents an additional lamp, and the horizontal axis thereof represents time.

In the control device 6 (CPU 12), as shown in FIG. 6, the relative relationship between the steering angle of the steering wheel and the turning on/off of the left-side additional lamp 1L or the right-side additional lamp 1R is as follows. That is, when the vehicle 7 is going into a curving road, the driver starts turning the steering wheel, and the steering angle of the steering wheel reaches a predetermined turn-on steering-angle or more (see t1 in the upper part of FIG. 6). Then, the turn-on signal is output to the driver circuit 13L for the left-side additional lamp 1L or the driver circuit 13R for the right-side additional lamp 1R on the side of the steering direction of the steering wheel, and the left-side additional lamp 1L or the right-side additional lamp 1R turns on (see the upward arrow "↑" indicating movement from 0% to 100% at t1 in the lower part of FIG. 6). The turn-on steering angle is 40 degrees the same as the turn-on steering angle of the first embodiment.

Along the curving road, the driver returns the steering wheel to a position at a given steering angle or more that is returned from its maximum steering angle, that is, the steering angle of the steering wheel returned from the maximum steering angle reaches a predetermined light-dimming steering-angle (see t2 in the upper part of FIG. 6). Then, the light dimming signal is output to the driver circuit 13L for the left-side additional lamp 1L or the driver circuit 13R for the right-side additional lamp 1R that is in its on-state, and the left-side additional lamp 1L or the right-side additional lamp 1R starts dimming (see the right downward slanting arrow starting from 100% at t2 in the lower part of FIG. 6). Although the light dimming steering angle is fixed and an arbitrary value irrespective of the vehicle speed, it is set to, for example, 20 degrees in this example. More specifically, if the maximum steering angle of the steering wheel is 100 degrees and if the steering angle of the steering wheel is returned from 100 degrees to 80 degrees, then the light dimming steering angle becomes 100°−80°=20°. Therefore, the light dimming signal is output.

Furthermore, the driver returns the steering wheel, and the steering angle of the steering wheel reaches the forced-complete-turn-off steering angle or less (see t3 in the upper part of FIG. 6). Then, the forced-complete-turn-off signal is output to the driver circuit 13L for the left-side additional lamp 1L or the driver circuit 13R for the right-side additional lamp 1R that is in its light dimming state, and the left-side additional lamp 1L or the right-side additional lamp 1R is forcefully and completely turned off (see the downward arrow "↓" ended at 0% at t3 in the lower part of FIG. 6). The forced-complete-turn-off steering angle is set to, for example, 20 degrees the same as that according to the first embodiment.

The vehicle lighting apparatus according to the second embodiment is configured in the above manner, and processes of the vehicle lighting apparatus according to the second embodiment are explained below. However, a process in the processes of the vehicle lighting apparatus according to the second embodiment is different from the process at step S10 of FIG. 5 (procedure of the process at the step) in the processes of the vehicle lighting apparatus according to the first embodiment. Therefore, the different process is explained below.

More specifically, at step S4 of FIG. 5, if the left-side additional lamp 1L or the right-side additional lamp 1R is in its on-state, the CPU 12 determines whether a steering direction of the steering wheel is a direction in which the steering wheel is turned or a direction in which the steering wheel is returned. If the steering direction is the direction in which the steering wheel is turned, the CPU 12 compares a maximum steering angle of the steering wheel with a steering angle read-in. If the steering angle read-in is greater than the maximum steering angle, the CPU 12 updates the maximum steering angle with the steering angle read-in.

If the steering direction is the direction in which the steering wheel is returned, the CPU 12 determines whether a difference between the maximum steering angle and the steering angle read-in is greater than the predetermined light-dimming steering-angle in the steering angle of the steering wheel returned. If the difference between the maximum steering angle and the steering angle read-in is greater than the predetermined light-dimming steering-angle (see "maximum value of steering angle—steering angle read-in >given angle" at t2 in the upper part of FIG. 6), the CPU 12 outputs the light dimming signal to the driver circuit 13L for the left-side additional lamp 1L or the driver circuit 13R for the right-side additional lamp 1R that is in its on-state. Then, the left-side additional lamp 1L or the right-side additional lamp 1R in its on-state starts dimming (see the right downward slanting arrow starting from 100% at t2 in the lower part of FIG. 6). As a result, the left-side additional lamp 1L or the right-side additional lamp 1R is in its light dimming state. If the difference between the maximum steering angle and the steering angle read-in is smaller than the light dimming steering angle (see "maximum value of steering angle—steering angle read-in <given angle" between t1 and t2 in the upper part of FIG. 6), the CPU 12 returns to step S1 of FIG. 5. In other words, the left-side additional lamp 1L or the right-side additional lamp 1R is in its on-state.

Thereafter, if the steering angle is the forced-complete-turn-off steering angle or less (see t3 in the upper part of FIG. 6), in the same manner as that of the first embodiment, the CPU 12 determines whether the left-side additional lamp 1L or the right-side additional lamp 1R is in its light dimming state. If the left-side additional lamp 1L or the right-side additional lamp 1R is in its light dimming state, then the left-side additional lamp 1L or the right-side additional lamp 1R in its light dimming state enters the forced complete turn-off state (see the downward arrow "↓" ended at 0% at t3 in the lower part of FIG. 6).

The configuration and the processes of the vehicle lighting apparatus according to the second embodiment are provided in the above manner, and therefore, it is possible to achieve the same effects as these of the vehicle lighting apparatus according to the first embodiment.

In the vehicle lighting apparatus according to the second embodiment, the maximum steering angle of the steering wheel is set as a reference for a timing of dimming the left-side additional lamp 1L or the right-side additional lamp 1R in its on-state. On the other hand, in the vehicle lighting apparatus according to the second embodiment, the maximum steering angle of the steering wheel is different based on a curve radius of a curving road. For example, if the curve radius increases, the maximum steering angle decreases. Conversely, if the curve radius decreases, the maximum steering angle increases. As a result, the vehicle lighting apparatus according to the second embodiment allows the left-side additional lamp 1L or the right-side additional lamp 1R in its on-state to be reliably turned off at an almost fixed timing of turning off the light on curving roads having different curve radiuses.

Figure 7:
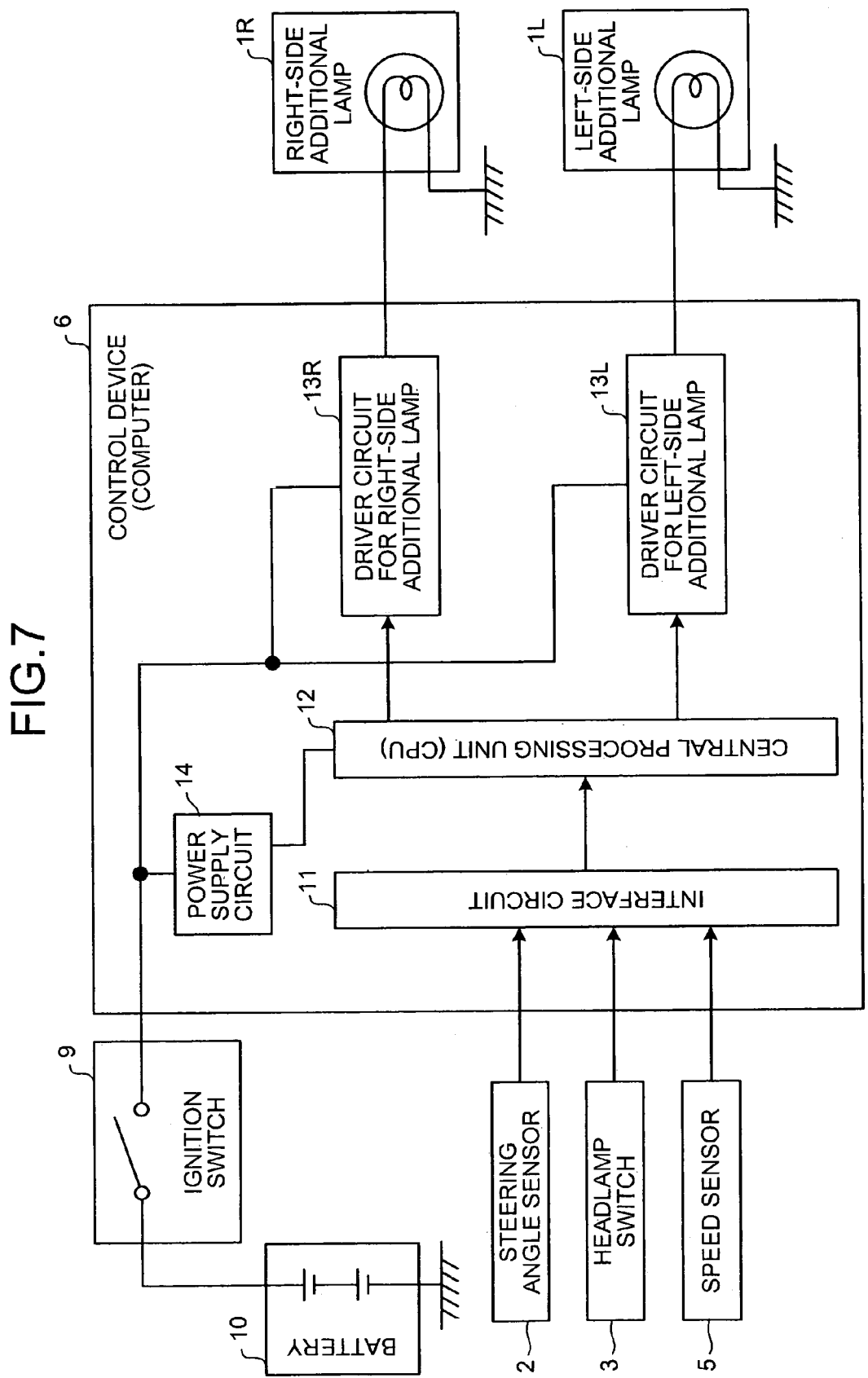
FIG. 7 is a block diagram of a configuration of a vehicle lighting apparatus according to a third embodiment of the present invention.
Figure 8:
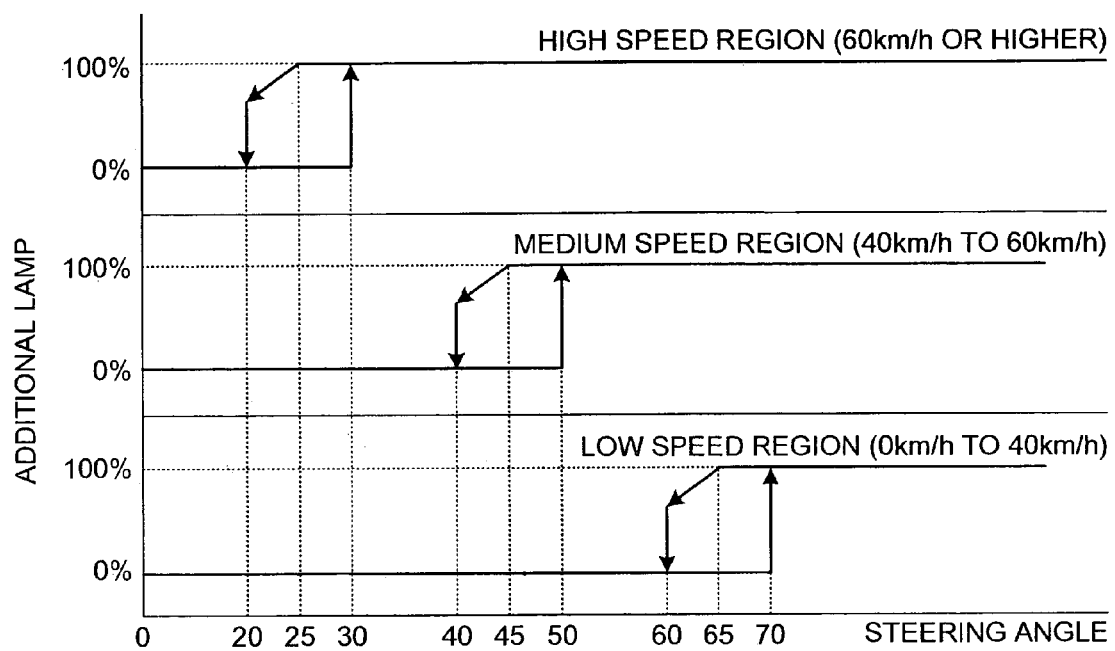
FIG. 8 is a diagram for explaining a relative relationship between a steering angle of a steering wheel and turning on/off of the left-side additional lamp or the right-side additional lamp according to the third embodiment.
Figure 9:
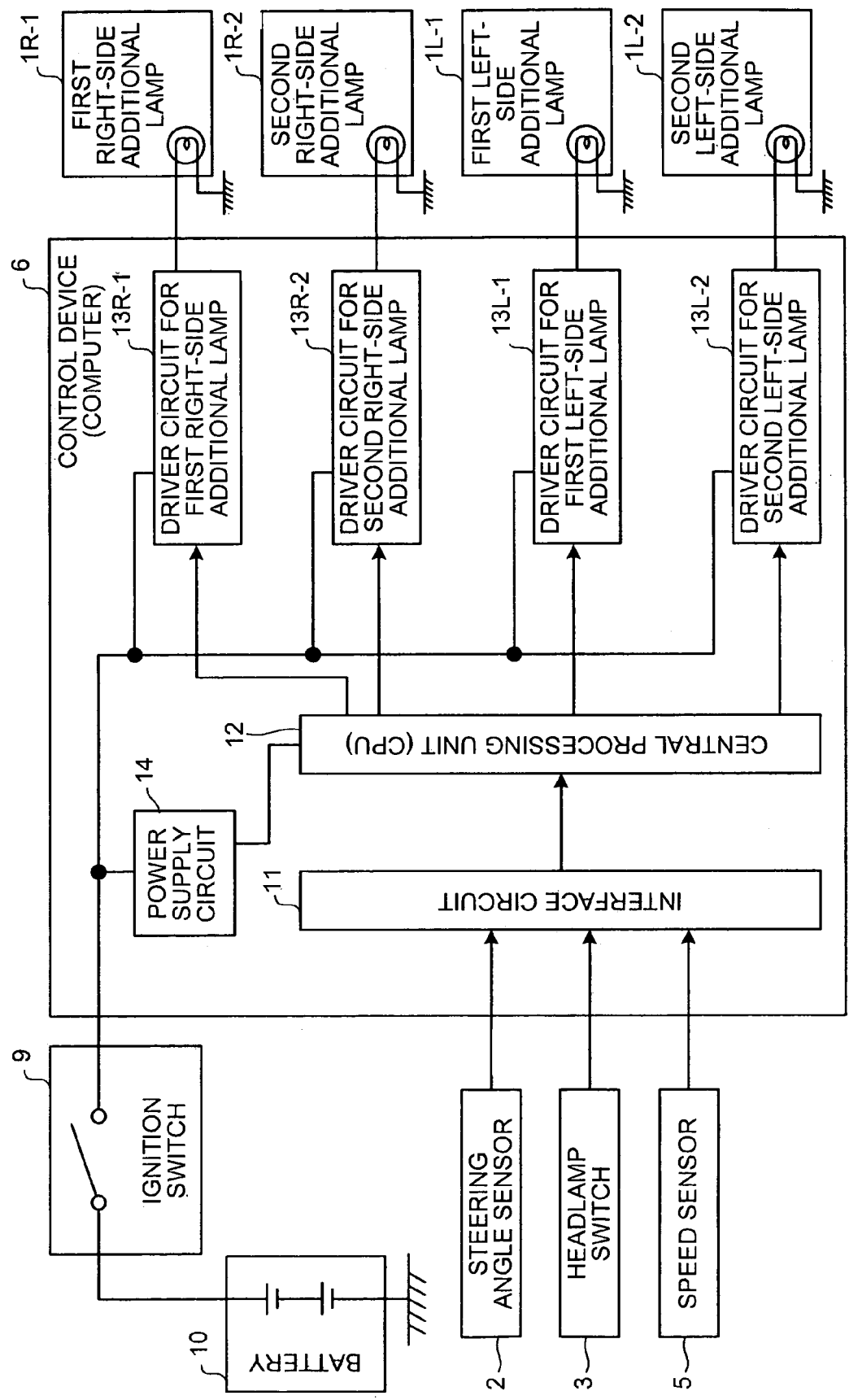
FIG. 9 is a block diagram of a configuration of a vehicle lighting apparatus according to a fourth embodiment of the present invention.
Figure 10:
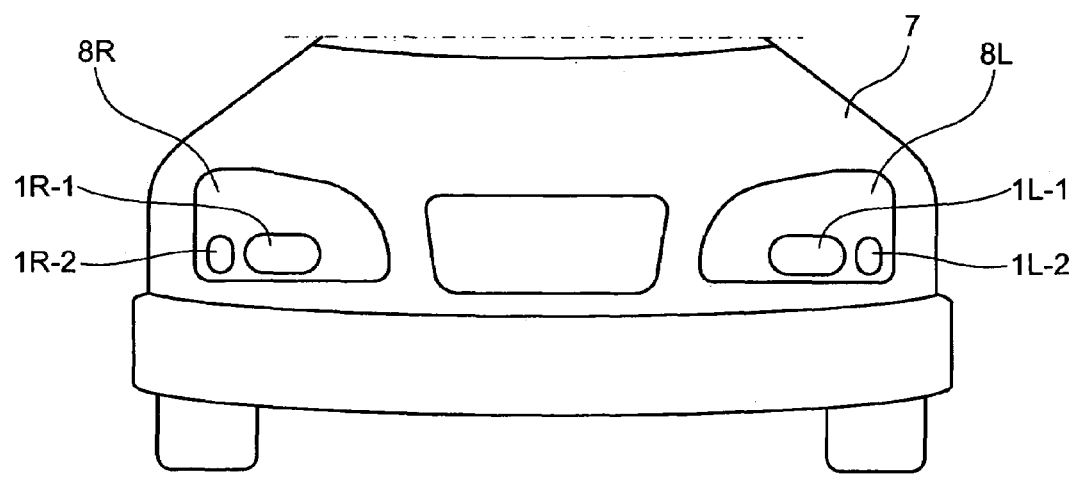
FIG. 10 is a partial front view of a vehicle that incorporates the vehicle lighting apparatus according to the fourth embodiment.
Figure 11:
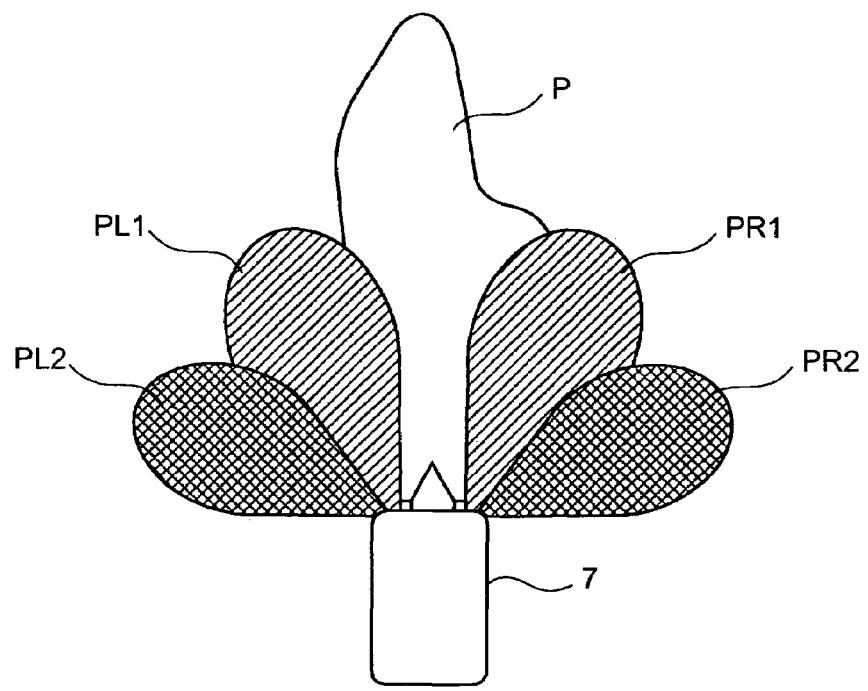
FIG. 11 is a flat diagram for explaining a light distribution pattern of a headlamp, a light distribution pattern of a first left-side additional lamp, a light distribution pattern of a second left-side additional lamp, a light distribution pattern of a first right-side additional lamp, and a light distribution pattern of a second right-side additional lamp according to the fourth embodiment.

FIG. 7 and FIG. 8 indicate a vehicle lighting apparatus according to a third embodiment of the present invention. The vehicle lighting apparatus according to the third embodiment is explained below. In the figures, the same reference signs as these in FIG. 1 to FIG. 6 represent the same parts.

As shown in FIG. 7, reference sign 5 represents a speed sensor. The speed sensor 5 detects a speed of a vehicle and outputs a speed signal to the control device 6. FIG. 8 is a diagram for explaining a relative relationship between a steering angle of the steering wheel and turning on/off of the left-side additional lamp or the right-side additional lamp. The vertical axis of the graph represents an additional lamp, and the horizontal axis thereof represents a steering angle.

In the control device 6 (CPU 12), as shown in FIG. 8, the relative relationship between the steering angle of the steering wheel and the turning on/off of the left-side additional lamp 1L or the right-side additional lamp 1R is as follows. That is, when the vehicle 7 is going into a curving road, the driver starts turning the steering wheel, and the steering angle of the steering wheel reaches a predetermined turn-on steering-angle or more. Then, the turn-on signal is output to the driver circuit 13L for the left-side additional lamp 1L or the driver circuit 13R for the right-side additional lamp 1R on the side of the steering direction of the steering wheel, and the left-side additional lamp 1L or the right-side additional lamp 1R turns on (see the upward arrows "↑" indicating movement from 0% to 100% at steering angles of 70 degrees, 50 degrees, and 30 degrees in FIG. 8). The turn-on steering angle is set different according to the vehicle speed, and it is smaller when the vehicle speed is higher. Each turn-on steering angle that is set different according to the vehicle speed is an arbitrary value. However, for example, it is set to 70 degrees when the vehicle speed is in a low speed region (e.g., 0 to 40 km/h), 50 degrees when the vehicle speed is in a medium speed region (e.g., 40 to 60 km/h), and 30 degrees when the vehicle speed is in a high speed region (e.g., 60 km/h or higher).

The driver starts returning the steering wheel while the vehicle 7 is traveling along the curving road, and the steering angle of the steering wheel reaches the light dimming steering angle or less. Then, the light dimming signal is output to the driver circuit 13L for the left-side additional lamp 1L or the driver circuit 13R for the right-side additional lamp 1R that is in its on-state, and the left-side additional lamp 1L or the right-side additional lamp 1R starts dimming (see the left downward slanting arrows starting from 100% at steering angles of 65 degrees, 45 degrees, and 25 degrees of FIG. 8). The light dimming steering angle is set different according to the vehicle speed, and is smaller when the vehicle speed is higher. Each light dimming steering angle that is set different according to the vehicle speed is an arbitrary value. However, for example, it is set to 65 degrees when the vehicle speed is in the low speed region (e.g., 0 to 40 km/h), 45 degrees when the vehicle speed is in the medium speed region (e.g., 40 to 60 km/h), and 25 degrees when the vehicle speed is in the high speed region (e.g., 60 km/h or higher).

The driver returns the steering wheel while the vehicle 7 is traveling along the curving road, and the steering angle of the steering wheel reaches the forced-complete-turn-off steering angle or less. Then, the forced-complete-turn-off signal is output to the driver circuit 13L for the left-side additional lamp 1L or the driver circuit 13R for the right-side additional lamp 1R that is in its light dimming state, and the left-side additional lamp 1L or the right-side additional lamp 1R is forcefully and completely turned off (see the downward arrows "↓" ended at 0% at steering angles of 60 degrees, 40 degrees, and 20 degrees of FIG. 8). The forced-complete-turn-off steering angle is set different according to the vehicle speed, and is smaller when the vehicle speed is higher. Each forced-complete-turn-off steering angle that is set different according to the vehicle speed is an arbitrary value. However, for example, it is set to 60 degrees when the vehicle speed is in the low speed region (e.g., 0 to 40 km/h), 40 degrees when the vehicle speed is in the medium speed region (e.g., 40 to 60 km/h), and 20 degrees when the vehicle speed is in the high speed region (e.g., 60 km/h or higher).

The vehicle lighting apparatus according to the third embodiment is configured in the above manner. The processes of the vehicle lighting apparatus according to the third embodiment are explained below.

At first, it is determined whether the speed of the vehicle 7 that enters the curving road is in the low speed region (e.g., 0 to 40 km/h), the medium speed region (e.g., 40 to 60 km/h), and the high speed region (e.g., 60 km/h or higher). Then, in each of the speed regions, it is determined whether the steering angle of the steering wheel is not less than the turn-on steering angle. If the steering angle is not less than the turn-on steering angle, the left-side additional lamp 1L or the right-side additional lamp 1R turns on (see the upward arrows "↑" indicating movement from 0% to 100% at steering angles of 70 degrees, 50 degrees, and 30 degrees of FIG. 8). For example, if the vehicle speed is in the low speed region (e.g., 0 to 40 km/h) and if the steering angle of the steering wheel is not less than 70 degrees, then the left-side additional lamp 1L or the right-side additional lamp 1R turns on (see the upward arrow "↑" indicating movement from 0% to 100% in the low speed region of FIG. 8). If the vehicle speed is in the medium speed region (e.g., 40 to 60 km/h) and if the steering angle of the steering wheel is not less than 50 degrees, then the left-side additional lamp 1L or the right-side additional lamp 1R turns on (see the upward arrow "↑" indicating movement from 0% to 100% in the medium speed region of FIG. 8). If the vehicle speed is in the high speed region (e.g., 60 km/h or higher) and if the steering angle of the steering wheel is not less than 30 degrees, then the left-side additional lamp 1L or the right-side additional lamp 1R turns on (see the upward arrow "↑" indicating movement from 0% to 100% in the high speed region of FIG. 8).

In each of the speed regions, it is determined whether the steering angle of the steering wheel is not more than the light dimming steering angle. If the steering angle is not more than the light dimming steering angle, the left side additional lamp 1L or the right-side additional lamp 1R in its turn-on state starts dimming (see the left downward slanting arrows starting from 100% at the steering angles of 65 degrees, 45 degrees, and 25 degrees of FIG. 8). For example, if the vehicle speed is in the low speed region (e.g., 0 to 40 km/h) and if the steering angle of the steering wheel is not more than 65 degrees, then the left-side additional lamp 1L or the right-side additional lamp 1R in its turn-on state starts dimming (see the left downward slanting arrow starting from 100% in the low speed region of FIG. 8). If the vehicle speed is in the medium speed region (e.g., 40 to 60 km/h) and if the steering angle of the steering wheel is not more than 45 degrees, then the left-side additional lamp 1L or the right-side additional lamp 1R in its turn-on state starts dimming (see the left downward slanting arrow starting from 100% in the medium speed region of FIG. 8). If the vehicle speed is in the high speed region (e.g., 60 km/h or higher) and if the steering angle of the steering wheel is not more than 25 degrees, then the left-side additional lamp 1L or the right-side additional lamp 1R in its turn-on state starts dimming (see the left downward slanting arrow starting from 100% in the high speed region of FIG. 8).

Furthermore, in each of the speed regions, it is determined whether the steering angle of the steering wheel is not more than the forced-complete-turn-off steering angle. If the steering angle is not more than the forced-complete-turn-off steering angle, the left-side additional lamp 1L or the right-side additional lamp 1R in its light dimming state is forcefully and completely turned off (see the downward arrows "↓" ended at 0% at the steering angles of 60 degrees, 40 degrees, and 20 degrees of FIG. 8). For example, if the vehicle speed is in the low speed region (e.g., 0 to 40 km/h) and if the steering angle of the steering wheel is not more than 60 degrees, then the left-side additional lamp 1L or the right-side additional lamp 1R in its light dimming state is forcefully and completely turned off (see the downward arrow "↓" ended at 0% in the low speed region of FIG. 8). If the vehicle speed is in the medium speed region (e.g., 40 to 60 km/h) and if the steering angle of the steering wheel is not more than 40 degrees, then the left-side additional lamp 1L or the right-side additional lamp 1R in its light dimming state is forcefully and completely turned off (see the downward arrow "↓" ended at 0% in the medium speed region of FIG. 8). If the vehicle speed is in the high speed region (e.g., 60 km/h or higher) and if the steering angle of the steering wheel is not more than 20 degrees, then the left-side additional lamp 1L or the right-side additional lamp 1R in its light dimming state is forcefully and completely turned off (see the downward arrow "↓" ended at 0% in the high speed region of FIG. 8).

As is clear from the configuration and the processes of the vehicle lighting apparatus according to the third embodiment, the same effects as these of the vehicle lighting apparatus according to the first embodiment and the second embodiment can be achieved. Particularly, in the vehicle lighting apparatus according to the third embodiment, if the vehicle speed is high, the light dimming steering angle and the forced-complete-turn-off steering angle are small. Conversely, if the vehicle speed is low, the light dimming steering angle and the forced-complete-turn-off steering angle are large. Therefore, in the vehicle lighting apparatus according to the third embodiment, if the vehicle speed is low, the left-side additional lamp 1L or the right-side additional lamp 1R in its on-state dims, and then is forcefully and completely turned off when the driver starts returning the steering wheel in the latter half of the curving road. Therefore, neither uncomfortable feeling nor annoyingness is given to the driver-who starts returning the steering wheel in the latter half of the curving road and is looking ahead of the end of the curving road. On the other hand, if the vehicle speed is high, the left-side additional lamp 1L or the right-side additional lamp 1R stays on until the driver almost finishes returning the steering wheel at the almost end of the curving road. Therefore, the safety of high speed traveling is ensured. Moreover, there is neither uncomfortable feeling nor annoyingness for the driver while driving looking at the curving road along the traveling direction of the vehicle 7 until he/she almost finishes returning the steering wheel. As explained above, in the vehicle lighting apparatus according to the third embodiment, the timing of movement of the driver's eye point is consistent with the timing of turning off the left-side additional lamp 1L or the right-side additional lamp 1R. This does not cause uncomfortable feeling or annoyingness to be given to the driver, which allows contribution to traffic safety.

In the vehicle lighting apparatus according to the third embodiment, the turn-on steering angles are set different according to the vehicle speeds, and the turn-on steering angle is smaller if the vehicle speed is higher. Therefore, in the vehicle lighting apparatus according to the third embodiment, if the vehicle speed is low, the left-side additional lamp 1L or the right-side additional lamp 1R turns on when the driver turns the steering wheel to some extent at the start of the curving road. Therefore, there is neither uncomfortable feeling nor annoyingness for the driver while he/she starts looking at the curving road along the traveling direction of the vehicle at the start of the curving road. On the other hand, if the vehicle speed is high, the left-side additional lamp 1L or the right-side additional lamp 1R turns on when the driver starts turning the steering wheel at the start of the curving road. Therefore, the safety of high speed traveling is ensured. Moreover, there is neither uncomfortable feeling nor annoyingness for the driver while driving looking at the curving road along the traveling direction of the vehicle at the start of the curving road. As explained above, in the vehicle lighting apparatus according to the third embodiment, the timing of movement of the driver's eye point is consistent with the timing of turning on the additional lamps. This does not cause uncomfortable feeling or annoyingness to be given to the driver, which allows contribution to traffic safety.

In the vehicle lighting apparatus according to the third embodiment, the turn-on steering angle, the light dimming steering angle, and the forced-complete-turn-off steering angle are set different according to the vehicle speeds. And, there is a mutual correlation among the vehicle speed when the left-side additional lamp 1L or the right-side additional lamp 1R is on, the vehicle speed when the left-side additional lamp 1L or the right-side additional lamp 1R is dimming, and the vehicle speed when the left-side additional lamp 1L or the right-side additional lamp 1R is forcefully and completely turned off. More specifically, if the vehicle speed is in, for example, the low speed region (medium speed region, or high speed region) and if the left-side additional lamp 1L or the right-side additional lamp 1R turns on, then the left-side additional lamp 1L or the right-side additional lamp 1R in its on state dims conditionally on a light dimming steering angle that is required when the vehicle speed is in the low speed region (medium speed region, or high speed region). Furthermore, the left-side additional lamp 1L or the right-side additional lamp 1R is forcefully and completely turned off conditionally on a forced-complete-turn-off steering angle that is required when the vehicle speed is in the low speed region (medium speed region, or high speed region).

However, in the present invention, there may be no need to obtain the mutual correlation among the vehicle speed when the left-side additional lamp 1L or the right-side additional lamp 1R is on, the vehicle speed when the left-side additional lamp 1L or the right-side additional lamp 1R is dimming, and the vehicle speed when the left-side additional lamp 1L or the right-side additional lamp 1R is forcefully and completely turned off. In other words, the turn-on steering angle may be set to be fixed irrespective of vehicle speeds while each of the light dimming steering angle and the forced-complete-turn-off steering angle may be set different according to each of the vehicle speeds. In this case, the left-side additional lamp 1L or the right-side additional lamp 1R turns on under the condition of the turn-on steering angle irrespective of the vehicle speeds. The left-side additional lamp 1L or the right-side additional lamp 1R dims under the conditions of the vehicle speed and the light dimming steering angle. Furthermore, the left-side additional lamp 1L or the right-side additional lamp 1R is forcefully and completely turned off under the conditions of the vehicle speed and the forced-complete-turn-off steering angle.

FIG. 9 to FIG. 12 indicate a vehicle lighting apparatus according to a fourth embodiment of the present invention. The vehicle lighting apparatus according to the fourth embodiment is explained below. In the figures, the same reference signs as these in FIG. 1 to FIG. 8 represent the same parts.

As shown in FIG. 9 to FIG. 12, the vehicle lighting apparatus according to the fourth embodiment is configured by additionally providing a left-side additional lamp 1L-1 and a left-side additional lamp 1L-2 on the left side of the front of the vehicle 7, and additionally providing a right-side additional lamp 1R-1 and a right-side additional lamp 1R-2 on the right side thereof. In this example, two devices are provided on each of the left side and the right side (see Related technology 1, Related technology 2, and Japanese Patent Application Laid-Open No. 2000-238576). In other words, a first left-side additional lamp 1L-1 is provided in an inner side on the left side of the front of the vehicle 7. A second left-side additional lamp 1L-2 is provided in an outer side on the left side thereof. A first right-side additional lamp 1R-1 is provided in an inner side on the right side of the front of the vehicle 7. A second right-side additional lamp 1R-2 is provided in an outer side on the right side thereof.

The first left-side additional lamp 1L-1 illuminates the road surface and the like with a given light distribution pattern PL1 on the left side of the light distribution pattern P of the lights that are illuminated by the headlamp 8L and the headlamp 8R. The second left-side additional lamp 1L-2 illuminates the road surface and the like with a given light distribution pattern PL2 that is on the left side of the light distribution pattern P, and on the outer side of the light distribution pattern PL1 by the first left-side additional lamp 1L-1. The first right-side additional lamp 1R-1 illuminates the road surface and the like with a given light distribution pattern PR1 on the right side of the light distribution pattern P. The second right-side additional lamp 1R-2 illuminates the road surface and the like with a given light distribution pattern PR2 that is on the right side of the light distribution pattern P, and on the outer side of the light distribution pattern PR1 by the first right-side additional lamp 1R-1.

The control device 6 of the vehicle lighting apparatus according to the fourth embodiment includes a first left-side additional-lamp driver circuit 13L-1 connected with the first left-side additional lamp 1L-1, a second left-side additional-lamp driver circuit 13L-2 connected with the second left-side additional lamp 1L-2, a first right-side additional-lamp driver circuit 13R-1 connected with the first right-side additional lamp 1R-1, and a second right-side additional-lamp driver circuit 13R-2 connected with the second right-side additional lamp 1R-2. The first left-side additional-lamp driver circuit 13L-1, the second left-side additional-lamp driver circuit 13L-2, the first right-side additional-lamp driver circuit 13R-1, and the second right-side additional-lamp driver circuit 13R-2 are connected to a battery 10 through the ignition switch 9, and also to the CPU 12.

The CPU 12 sequentially performs the processes of turning on/off the first left-side additional lamp 1L-1, the second left-side additional lamp 1L-2, the first right-side additional lamp 1R-1, and the second right-side additional lamp 1R-2, based on the signals processed from the interface circuit 11. Furthermore, the CPU 12 outputs a turn-on signal and a turn-off signal, based on the steering angle-turning on/off characteristics as shown in FIG. 12, to the first left-side additional-lamp driver circuit 13L-1, the second left-side additional-lamp driver circuit 13L-2, the first right-side additional-lamp driver circuit 13R-1, and the second right-side additional-lamp driver circuit 13R-2.

Figure 12:
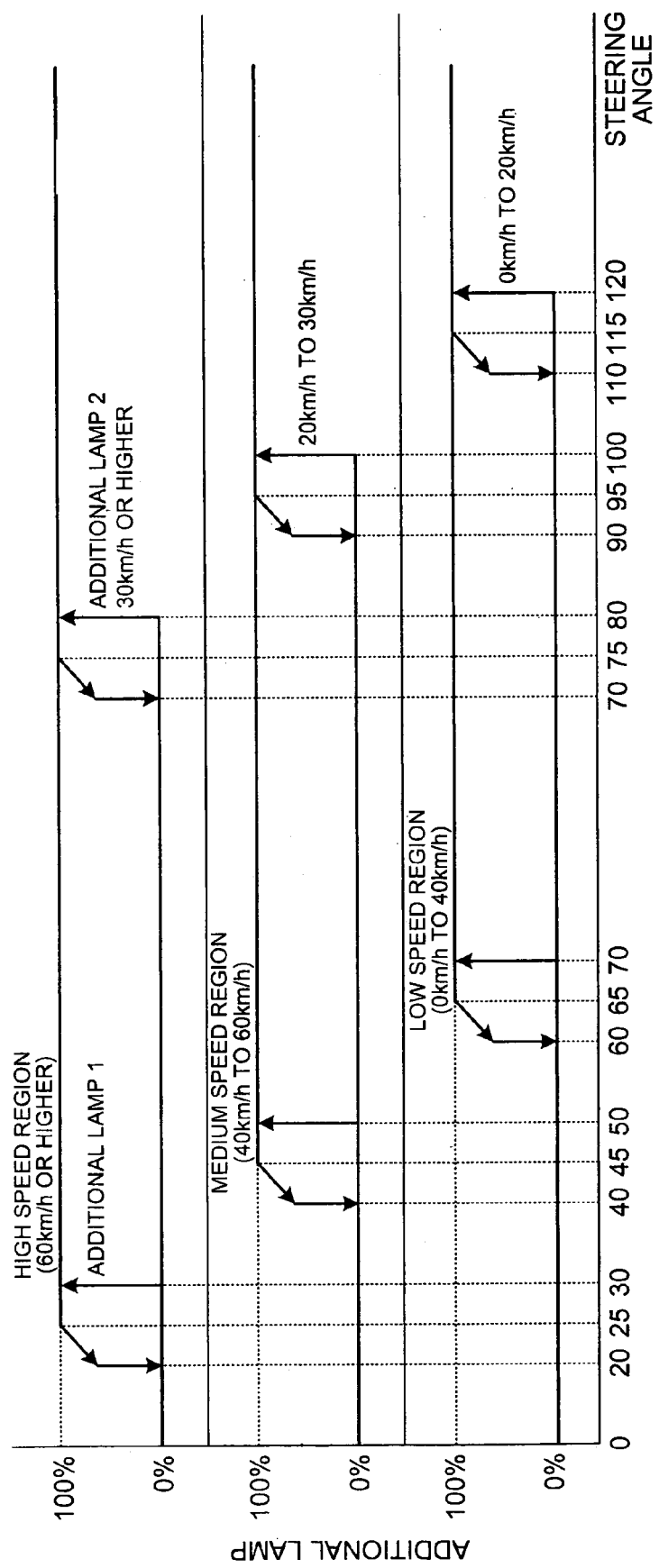
FIG. 12 is a diagram for explaining a relative relationship between a steering angle of a steering wheel and turning on/off of the left-side additional lamp or the right-side additional lamp according to the fourth embodiment.

FIG. 12 is a diagram for explaining a relative relationship between a steering angle of the steering wheel and turning on/off of the first left-side additional lamp 1L-1, the second left-side additional lamp 1L-2, the first right-side additional lamp 1R-1, and the second right-side additional lamp 1R-2. The vertical axis of the graph represents an additional lamp, and the horizontal axis thereof represents a steering angle.

As shown in FIG. 12, the relative relationship between the steering angle of the steering wheel and the turning on/off of the first left-side additional lamp 1L-1, the second left-side additional lamp 1L-2, the first right-side additional lamp 1R-1, or of the second right-side additional lamp 1R-2 is as follows. Furthermore, the relative relationship between the steering angle of the steering wheel and the turning on/off of the first left-side additional lamp 1L-1 or the first right-side additional lamp 1R-1 (additional lamp 1 shown in FIG. 12) is almost the same as the relative relationship between the steering angle of the steering wheel and the turning on/off of the left-side additional lamp 1L or the right-side additional lamp 1R as shown in FIG. 8. That is, the relative relationship between the steering angle of the steering wheel and the turning on/off of the second left-side additional lamp 1L-2 or the second right-side additional lamp 1R-2 (additional lamp 2 shown in FIG. 12) is added to the configuration of FIG. 8.

More specifically, when the vehicle 7 is going into a curving road, the driver starts turning the steering wheel, and the steering angle of the steering wheel reaches a given first turn-on steering angle or more. Then, a turn-on signal is output to the driver circuit 13L-1 for the first left-side additional lamp 1L-1 or the driver circuit 13R-1 for the first right-side additional lamp 1R-1 on the side of the steering direction of the steering wheel, and the first left-side additional lamp 1L-1 or the first right-side additional lamp 1R-1 turns on (see the upward arrows "↑" indicating movement from 0% to 100% at steering angles of 70 degrees, 50 degrees, and 30 degrees of FIG. 12). Furthermore, when the vehicle 7 is traveling along the curving road, the driver turns the steering wheel, and the steering angle of the steering wheel reaches a second turn-on steering angle or more. Then, a turn-on signal is output to the driver circuit 13L-2 for the second left-side additional lamp 1L-2 or the driver circuit 13R-2 for the second right-side additional lamp 1R-2 on the side of the steering direction of the steering wheel, and the second left-side additional lamp 1L-2 or the second right-side additional lamp 1R-2 turns on (see the upward arrows "↑" indicating movement from 0% to 100% at steering angles of 120 degrees, 100 degrees, and 80 degrees of FIG. 12). Each of the first turn-on steering angle and the second turn-on steering angle is set different according to the vehicle speed, and the turn-on steering angle is smaller when the vehicle speed is higher. Each first turn-on steering angle that is set different according to the vehicle speed is an arbitrary value. However, for example, it is set to 70 degrees when the vehicle speed is in the low speed region (e.g., 0 to 40 km/h), 50 degrees when the vehicle speed is in the medium speed region (e.g., 40 to 60 km/h), and 30 degrees when the vehicle speed is in the high speed region (e.g., 60 km/h or higher). Each second turn-on steering angle that is set different according to the vehicle speed is an arbitrary value. However, for example, it is set to 120 degrees when the vehicle speed is in the low speed region (e.g., 0 to 20 km/h), 100 degrees when the vehicle speed is in the medium speed region (e.g., 20 to 30 km/h), and 80 degrees when the vehicle speed is in the high speed region (e.g., 30 km/h or higher).

When the driver starts returning the steering wheel in the latter half of the curving road, and the steering angle of the steering wheel reaches a second light dimming steering angle or less. Then, a light dimming signal is output to the driver circuit 13L-2 for the second left-side additional lamp 1L-2 or the driver circuit 13R-2 for the second right-side additional lamp 1R-2 that is in its on-state, and the second left-side additional lamp 1L-2 or the second right-side additional lamp 1R-2 starts dimming (see the left downward slanting arrows starting from 100% at steering angles of 115 degrees, 95 degrees, and 75 degrees of FIG. 12). Furthermore, when the vehicle 7 is approaching the end of the curving road, the driver returns the steering wheel, and the steering angle of the steering wheel reaches a first light dimming steering angle or less. Then, a light dimming signal is output to the driver circuit 13L-1 for the first left-side additional lamp 1L-1 or the driver circuit 13R-1 for the first right-side additional lamp 1R-1, and the first left-side additional lamp 1L-1 or the first right-side additional lamp 1R-1 starts dimming (see the left downward slanting arrows starting from 100% at the steering angles of 65 degrees, 45 degrees, and 25 degrees of FIG. 12). Each of the first light dimming steering angle and the second light dimming steering angle is set different according to the vehicle speed, and it is smaller when the vehicle speed is higher. Each second light dimming steering angle that is set different according to the vehicle speed is an arbitrary value. However, for example, it is set to 115 degrees when the vehicle speed is in the low speed region (e.g., 0 to 20 km/h), 95 degrees when the vehicle speed is in the medium speed region (e.g., 20 to 30 km/h), and 75 degrees when the vehicle speed is in the high speed region (e.g., 30 km/h or higher). Furthermore, each first light dimming steering angle that is set different according to the vehicle speed is an arbitrary value. However, for example, it is set to 65 degrees when the vehicle speed is in the low speed region (e.g., 0 to 40 km/h), 45 degrees when the vehicle speed is in the medium speed region (e.g., 40 to 60 km/h), and 25 degrees when the vehicle speed is in the high speed region (e.g., 60 km/h or higher).

Furthermore, when the vehicle 7 is traveling along the curving road, the driver returns the steering wheel, and the steering angle of the steering wheel reaches a second forced-complete-turn-off steering angle or less. Then, a turn-off signal is output to the driver circuit 13L-2 for the second left-side additional lamp 1L-2 or the driver circuit 13R-2 for the second right-side additional lamp 1R-2 that is in its on-state, and the second left-side additional lamp 1L-2 or the second right-side additional lamp 1R-2 is forcefully and completely turned off (see the downward arrows "↓" ended at 0% at steering angles of 110 degrees, 90 degrees, and 70 degrees of FIG. 12). When the vehicle 7 is approaching the end of the curving road, the driver returns the steering wheel, and the steering angle of the steering wheel reaches a first forced-complete-turn-off steering angle or less. Then, a turn-off signal is output to the driver circuit 13L-1 for the first left-side additional lamp 1L-1 or the driver circuit 13R-1 for the first right-side additional lamp 1R-1 that is in its on-state, and the first left-side additional lamp 1L-1 or first right-side additional lamp 1R-1 is forcefully and completely turned off (see the downward arrows "↓" ended at 0% at steering angles of 60 degrees, 40 degrees, and 20 degrees of FIG. 12). Each of the first forced-complete-turn-off steering angle and the second forced-complete-turn-off steering angle is set different according to the vehicle speed, and it is smaller when the vehicle speed is higher. Each second forced-complete-turn-off steering angle that is set different according to the vehicle speed is an arbitrary value. However, for example, it is set to 110 degrees when the vehicle speed is in the low speed region (e.g., 0 to 20 km/h), 90 degrees when the vehicle speed is in the medium speed region (e.g., 20 to 30 km/h), and 70 degrees when the vehicle speed is in the high speed region (e.g., 30 km/h or higher). Each first forced-complete-turn-off steering angle that is set different according to the vehicle speed is also an arbitrary value. However, for example, it is set to 60 degrees when the vehicle speed is in the low speed region (e.g., 0 to 40 km/h), 40 degrees when the vehicle speed is in the medium speed region (e.g., 40 to 60 km/h), and 20 degrees when the vehicle speed is in the high speed region (e.g., 60 km/h or higher).

The vehicle lighting apparatus according to the fourth embodiment is configured in the above manner, and the processes of the vehicle lighting apparatus are explained below with reference to FIG. 12. At first, if the vehicle speed is in the low speed region (e.g., 0 to 40 km/h) and if the steering angle of the steering wheel reaches the first turn-on steering angle (70 degrees) that is set for the low speed region, then the first left-side additional lamp 1L-1 or the first right-side additional lamp 1R-1 turns on (see the upward arrow "↑" indicating movement from 0% to 100% at the steering angle of 70 degrees of FIG. 12). If the vehicle speed is in the medium speed region (e.g., 40 to 60 km/h) and if the steering angle of the steering wheel reaches the first turn-on steering angle (50 degrees) set for the medium speed region, then the first left-side additional lamp 1L-1 or the first right-side additional lamp 1R-1 turns on (see the upward arrow "↑" indicating movement from 0% to 100% at the steering angle of 50 degrees of FIG. 12). Furthermore, if the vehicle speed is in the high speed region (e.g., 60 km/h or higher) and if the steering angle of the steering wheel reaches the first turn-on steering angle (30 degrees) set for the high speed region, then the first left-side additional lamp 1L-1 or the first right-side additional lamp 1R-1 turns on (see the upward arrow "↑" indicating movement from 0% to 100% at the steering angle of 30 degrees of FIG. 12).

If the vehicle speed is in the low speed region (e.g., 0 to 20 km/h) and if the steering angle of the steering wheel reaches the second turn-on steering angle (120 degrees) set for the low speed region, then the second left-side additional lamp 1L-2 or the second right-side additional lamp 1R-2 turns on (see the upward arrow "↑" indicating movement from 0% to 100% at the steering angle of 120 degrees of FIG. 12). If the vehicle speed is in the medium speed region (e.g., 20 to 30 km/h) and if the steering angle of the steering wheel reaches the second turn-on steering angle (100 degrees) set for the medium speed region, then the second left-side additional lamp 1L-2 or the second right-side additional lamp 1R-2 turns on (see the upward arrow "↑" indicating movement from 0% to 100% at the steering angle of 100 degrees of FIG. 12). Furthermore, if the vehicle speed is in the high speed region (e.g., 30 km/h or higher) and if the steering angle of the steering wheel reaches the second turn-on steering angle (80 degrees) set for the high speed region, then the second left-side additional lamp 1L-2 or the second right-side additional lamp 1R-2 turns on (see the upward arrow "↑" indicating movement from 0% to 100% at the steering angle of 80 degrees of FIG. 12).

Referring to the second left-side additional lamp 1L-2 or the second right-side additional lamp 1R-2 that is in its on-state, if the vehicle speed is in the low speed region (e.g., 0 to 20 km/h) and if the steering angle of the steering wheel reaches the second light dimming steering angle (115 degrees) set for the low speed region, then the second left-side additional lamp 1L-2 or the second right-side additional lamp 1R-2 in its on-state starts dimming (see the left downward slanting arrow starting from 100% at the steering angle of 115 degrees of FIG. 12). If the vehicle speed is in the medium speed region (e.g., 20 to 30 km/h) and if the steering angle of the steering wheel reaches the second light dimming steering angle (95 degrees) set for the medium speed region, then the second left-side additional lamp 1L-2 or the second right-side additional lamp 1R-2 in its on-state starts dimming (see the left downward slanting arrow starting from 100% at the steering angle of 95 degrees of FIG. 12). Furthermore, if the vehicle speed is in the high speed region (e.g., 30 km/h or higher) and if the steering angle of the steering wheel reaches the second light dimming steering angle (75 degrees) set for the high speed region, then the second left-side additional lamp 1L-2 or the second right-side additional lamp 1R-2 in its on-state starts dimming (see the left downward slanting arrow starting from 100% at the steering angle of 75 degrees of FIG. 12).

Referring to the second left-side additional lamp 1L-2 or the second right-side additional lamp 1R-2 that is in its light dimming state, if the vehicle speed is in the low speed region (e.g., 0 to 20 km/h) and if the steering angle of the steering wheel reaches the second forced-complete-turn-off steering angle (110 degrees) set for the low speed region, then the second left-side additional lamp 1L-2 or the second right-side additional lamp 1R-2 in its light dimming state is forcefully and completely turned off (see the downward arrow "↓" ended at 0% at the steering angle of 110 degrees of FIG. 12). If the vehicle speed is in the medium speed region (e.g., 20 to 30 km/h), the steering angle of the steering wheel reaches the second forced-complete-turn-off steering angle (90 degrees) set for the medium speed region, then the second left-side additional lamp 1L-2 or the second right-side additional lamp 1R-2 in its light dimming state is forcefully and completely turned off (see the downward arrow "↓" ended at 0% at the steering angle of 90 degrees of FIG. 12). Furthermore, if the vehicle speed is in the high speed region (e.g., 30 km/h or higher) and if the steering angle of the steering wheel reaches the second forced-complete-turn-off steering angle (70 degrees) set for the high speed region, then the second left-side additional lamp 1L-2 or the second right-side additional lamp 1R-2 in its light dimming state is forcefully and completely turned off (see the downward arrow "↓" ended at 0% at the steering angle of 70 degrees of FIG. 12).

On the other hand, referring to the first left-side additional lamp 1L-1 or the first right-side additional lamp 1R-1 that is in its on-state, if the vehicle speed is in the low speed region (e.g., 0 to 40 km/h) and if the steering angle of the steering wheel reaches the first light dimming steering angle (65 degrees) set for the low speed region, then the first left-side additional lamp 1L-1 or the first right-side additional lamp 1R-1 in its on-state starts dimming (see the left downward slanting arrow starting from 100% at the steering angle of 65 degrees of FIG. 12). If the vehicle speed is in the medium speed region (e.g., 40 to 60 km/h) and if the steering angle of the steering wheel reaches the first light dimming steering angle (45 degrees) set for the medium speed region, then the first left-side additional lamp 1L-1 or the first right-side additional lamp 1R-1 in its on-state starts dimming (see the left downward slanting arrow starting from 100% at the steering angle of 45 degrees of FIG. 12). Furthermore, if the vehicle speed is in the high speed region (e.g., 60 km/h or higher) and if the steering angle of the steering wheel reaches the first light dimming steering angle (25 degrees) set for the high speed region, then the first left-side additional lamp 1L-1 or the first right-side additional lamp 1R-1 in its on-state starts dimming (see the left downward slanting arrow starting from 100% at the steering angle of 25 degrees of FIG. 12).

Referring to the first left-side additional lamp 1L-1 or the first right-side additional lamp 1R-1 that is in its light dimming state, if the vehicle speed is in the low speed region (e.g., 0 to 40 km/h) and if the steering angle of the steering wheel reaches the first forced-complete-turn-off steering angle (60 degrees) set for the low speed region, then the first left-side additional lamp 1L-1 or the first right-side additional lamp 1R-1 in its light dimming state is forcefully and completely turned off (see the downward arrow "↓" ended at 0% at the steering angle of 60 degrees of FIG. 12). If the vehicle speed is in the medium speed region (e.g., 40 to 60 km/h) and if the steering angle of the steering wheel reaches the first forced-complete-turn-off steering angle (40 degrees) set for the medium speed region, then the first left-side additional lamp 1L-1 or the first right-side additional lamp 1R-1 in its light dimming state is forcefully and completely turned off (see the downward arrow "↓" ended at 0% at the steering angle of 40 degrees of FIG. 12). Furthermore, if the vehicle speed is in the high speed region (e.g., 60 km/h or higher) and if the steering angle of the steering wheel reaches the first forced-complete-turn-off steering angle (20 degrees) set for the high speed region, then the first left-side additional lamp 1L-1 or the first right-side additional lamp 1R-1 in its light dimming state is forcefully and completely turned off (see the downward arrow "↓" ended at 0% at the steering angle of 20 degrees of FIG. 12).

The turn-on steering angle of the first left-side additional lamp 1L-1 or of the first right-side additional lamp 1R-1 may be set to the same angle as that of the second left-side additional lamp 1L-2 or of the second right-side additional lamp 1R-2. Based on this, it may be configured so that the first left-side additional lamp 1L-1 or the first right-side additional lamp 1R-1 provided in the inner side and the second left-side additional lamp 1L-2 or the second right-side additional lamp 1R-2 provided in the outer side are concurrently turned on. The light dimming steering angle of the first left-side additional lamp 1L-1 or of the first right-side additional lamp 1R-1 may be set to the same angle as that of the second left-side additional lamp 1L-2 or of the second right-side additional lamp 1R-2. Based on this, it may be configured so that the first left-side additional lamp 1L-1 or the first right-side additional lamp 1R-1 provided in the inner side and the second left-side additional lamp 1L-2 or the second right-side additional lamp 1R-2 provided in the outer side concurrently start dimming. Furthermore, the forced-complete-turn-off steering angle of the first left-side additional lamp 1L-1 or of the first right-side additional lamp 1R-1 may be set to the same angle as that of the second left-side additional lamp 1L-2 or of the second right-side additional lamp 1R-2. Based on this, it may be configured so that the first left-side additional lamp 1L-1 or the first right-side additional lamp 1R-1 provided in the inner side and the second left-side additional lamp 1L-2 or the second right-side additional lamp 1R-2 provided in the outer side are concurrently forcefully and completely turned off.

The configuration and the processes of the vehicle lighting apparatus according to the fourth embodiment are provided in the above manner, and therefore, it is possible to achieve almost the same effects as these of the vehicle lighting apparatus according to the first embodiment, the second embodiment, and the third embodiment. Particularly, the vehicle lighting apparatus according to the fourth embodiment includes the two left-side additional lamps 1L-1 and 1L-2, and the two right-side additional lamps 1R-1 and 1R-2. Therefore, turning-on/off variations of the two left-side additional lamps 1L-1 and 1L-2 and the two right-side additional lamps 1R-1 and 1R-2 increase. Moreover, light-distribution-pattern variations of the two left-side additional lamps 1L-1 and 1L-2 and the two right-side additional lamps 1R-1 and 1R-2 increase. Furthermore, the flexibility of controlling turning on/off of the additional lamps increases and the flexibility of light distribution design increases. Thus, it is possible to meet a variety of tastes and needs of users.

Although the vehicle lighting apparatus according to the fourth embodiment includes the two left-side additional lamps 1L-1 and 1L-2 and the two right-side additional lamps 1R-1 and 1R-2, the present invention may include three or more left-side additional lamps and three or more right-side additional lamps. In the vehicle lighting apparatus according to the fourth embodiment, the turn-on steering angle, the light dimming steering angle, and the forced-complete-turn-off steering angle are set different according to each vehicle speed. And, there is a mutual correlation among the vehicle speed when any one of the additional lamps 1L-1, 1L-2, 1R-1, and 1R-2 is on, the vehicle speed when it is dimming, and the vehicle speed when it is forcefully and completely turned off. However, in the present invention, there may be no need to obtain the correlation among the vehicle speed when one of the additional lamps 1L-1, 1L-2, 1R-1, and 1R-2 is on, the vehicle speed when it is dimming, and the vehicle speed when it is forcefully and completely turned off. Alternatively, each of the light dimming steering angle and the forced-complete-turn-off steering angle may be set different according to each vehicle speed.

Figure 13:
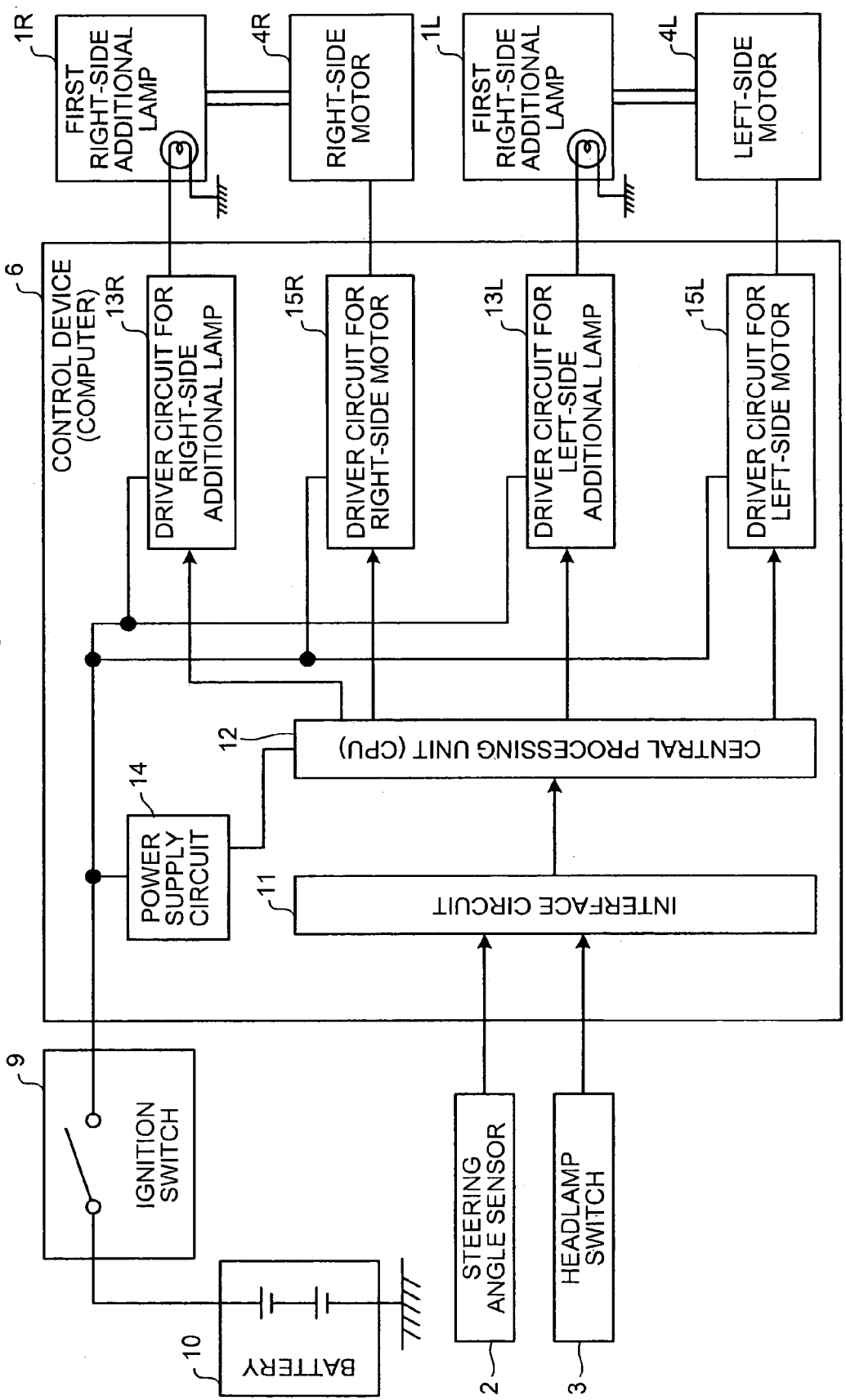
FIG. 13 is a block diagram of a configuration of a vehicle lighting apparatus according to a fifth embodiment of the present invention.

FIG. 13 indicates a vehicle lighting apparatus according to a fifth embodiment of the present invention. The vehicle lighting apparatus according to the fifth embodiment is explained below. In the figure, the same reference signs as these in the FIG. 1 to FIG. 12 represent the same parts.

As shown in FIG. 13, the vehicle lighting apparatus according to the fifth embodiment allows the left-side additional lamp 1L and the right-side additional lamp 1R to be swiveled (see Related technology 1 and Japanese Patent Application Laid-Open No. 2001-277936). More specifically, a rotating shaft of a left-side motor 4L is fixed to the left-side additional lamp 1L, and therefore, the left-side additional lamp 1L is laterally rotatable almost around its vertical axis by the left-side motor 4L. A rotating shaft of a right-side motor 4R is fixed to the right-side additional lamp 1R, and therefore, the right-side additional lamp 1R is laterally rotatable almost around its vertical axis by the right-side motor 4R.

The control device 6 of the vehicle lighting apparatus according to the fifth embodiment includes a left-side motor driver circuit 15L connected with the left-side motor 4L, and a right-side motor driver circuit 15R connected with the right-side motor 4R. The left-side motor driver circuit 15L and the right-side motor driver circuit 15R are connected to the battery 10 through the ignition switch 9, and also to the CPU 12.

The vehicle lighting apparatus according to the fifth embodiment is configured in the above manner. Therefore, when the steering angle of the steering wheel reaches the turn-on steering angle or more, the left-side additional lamp 1L or the right-side additional lamp 1R turns on. When the steering angle reaches the light dimming steering angle or less, the left-side additional lamp 1L or the right-side additional lamp 1R in its on-state starts dimming. When the steering angle reaches the forced-complete-turn-off steering angle or less, the left-side additional lamp 1L or the right-side additional lamp 1R in its light dimming state is forcefully and completely turned off. When the steering angle is the turn-on steering angle or more, if the steering wheel is steered in a turning direction, the left-side motor 4L or the right-side motor 4R is driven to cause the left-side additional lamp 1L or the right-side additional lamp 1R to rotate up to a given angle from the inner side toward the outer side. In other words, the left-side additional lamp 1L rotates leftward, and the right-side additional lamp 1R rotates rightward. On the other hand, if the steering wheel is steered in its returning direction, the left-side motor 4L or the right-side motor 4R is reversely driven to cause the left-side additional lamp 1L or the right-side additional lamp 1R to rotate from the outer side to the inner side. In other words, the left-side additional lamp 1L rotates rightward, and the right-side additional lamp 1R rotates leftward.

The configuration and the processes of the vehicle lighting apparatus according to the fifth embodiment are provided in the above manner. Therefore, almost the same effects as these of the vehicle lighting apparatus according to the first embodiment, the second embodiment, the third embodiment, and the fourth embodiment can be achieved. Particularly, in the vehicle lighting apparatus according to the fifth embodiment, the left-side additional lamp 1L or the right-side additional lamp 1R is allowed to be swiveled. Therefore, the light-distribution-pattern variations of the left-side additional lamp 1L and the right-side additional lamp 1R increase, and the flexibility of light distribution design increases. Thus, it is possible to meet a variety of tastes and needs of users.

Although the vehicle lighting apparatus according to the fifth embodiment includes one left-side additional lamps 1L and one right-side additional lamps 1R, and one left-side motor 4L and one right-side motor 4R, the present invention may include two or more left-side additional lamps and two or more right-side additional lamps, and two or more left-side motors and two or more right-side motors.

Some more examples other than the first, the second, the third, the fourth, and the fifth embodiments are explained below. In the vehicle lighting apparatus according to the first, the second, the third, the fourth, and the fifth embodiments, the left-side additional lamps 1L, 1L-1, and 1L-2 or the right-side additional lamps 1R, 1R-1, and 1R-2 turn on instantaneously. However, in the present invention, the left-side additional lamps 1L, 1L-1, and 1L-2 or the right-side additional lamps 1R, 1R-1, and 1R-2 may be turned on by gradually increasing the light (e.g., 0% to 100% lighting). The control of increasing the light may be performed by using the pulse width modulation (PWM) system or the voltage-controlled system (see Related technology 1 and Related technology 2).

In the vehicle lighting apparatus according to the first, the second, the third, the fourth, and the fifth embodiments, when the headlamp switch 3 is off, the process for turning the light off (including light dimming and forced complete turn-off) is performed on the left-side additional lamps 1L, 1L-1, and 1L-2 or the right-side additional lamps 1R, 1R-1, and 1R-2. When the headlamp switch 3 is on, the process for turning on/off the light is performed on the left-side additional lamps 1L, 1L-1, and 1L-2 or the right-side additional lamps 1R, 1R-1, and 1R-2. However, in the present invention, the process for turning on/off the light may be performed on the left-side additional lamps 1L, 1L-1, and 1L-2 or the right-side additional lamps 1R, 1R-1, and 1R-2, according to on/off of any switch other than the headlamp switch 3, such as on/off of the ignition switch 9, on/off of an accessory switch, and on/off of a switch specific to the additional lamps. Furthermore, in the present invention, when the head lamp 8L or the head lamp 8R is in its off-state, the process for turning on/off the light may be performed on the left-side additional lamps 1L, 1L-1, and 1L-2 or the right-side additional lamps 1R, 1R-1, and 1R-2.

In the vehicle lighting apparatus according to the first, the second, the third, the fourth, and the fifth embodiments, when the steering angle of the steering wheel reaches the predetermined light-dimming steering-angle or less, the light dimming is started. In the vehicle lighting apparatus according to the second embodiment, when the steering angle of the steering wheel returned reaches the predetermined light-dimming steering-angle or more from the maximum steering angle, the light dimming is started. However, in the present invention, when an angular speed upon returning of the steering wheel reaches a predetermined value or more, the light dimming may be started. In this case, if the driver returns the steering wheel at a speed faster than the given angular speed, the additional lamps 1L, 1L-1, 1L-2, 1R, 1R-1, or 1R-2, each of which is in its on-state, turns off. Therefore, neither uncomfortable feeling nor annoyingness is given to the driver who quickly returns the steering wheel and is looking ahead of the end of the curving road.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lighting apparatus for a vehicle, comprising:
    at least one additional lamp provided on a left side of a front of the vehicle;
    at least one additional lamp provided on a right side of the front of the vehicle;
    a steering-angle sensor that detects a steering angle and a steering direction of a steering wheel, and outputs a steering-angle signal and a steering-direction signal; and
    a control device that controls the additional lamps based on the steering-angle signal and the steering-direction signal, wherein
    when the steering angle is equal to or more than a predetermined turn-on steering-angle, the control device outputs a turn-on signal to the additional lamp on a side of the steering direction,
    when the steering angle satisfies a predetermined light-dimming condition, the control device outputs a light dimming signal to the additional lamp that is turned on, and
    when the steering angle is equal to or less than a predetermined forced-complete-turn-off steering-angle, the control device outputs a forced-complete-turn-off signal to the additional lamp that is dimmed,
    wherein
    the predetermined forced-complete-turn-off steering-angle varies according to a speed of the vehicle, and
    the faster the speed of the vehicle is, the smaller the predetermined forced-complete-turn-off steering-angle is.

2. The lighting apparatus according to claim 1, wherein the predetermined light-dimming condition includes at least one of a condition in which the steering angle is equal to or less than a predetermined light-dimming steering-angle, a condition in which a returning steering-angle of the steering wheel from a maximum steering angle is equal to or more than the predetermined light-dimming steering-angle, and a condition in which an angular speed of the steering wheel when the steering wheel is returned is equal to or more than a predetermined value.

3. A lighting apparatus for a vehicle, comprising:
    at least one additional lamp provided on a left side of a front of the vehicle;
    at least one additional lamp provided on a right side of the front of the vehicle;
    a steering-angle sensor that detects a steering angle and a steering direction of a steering wheel, and outputs a steering-angle signal and a steering-direction signal; and
    a control device that controls the additional lamps based on the steering-angle signal and the steering-direction signal, wherein
    when the steering angle is equal to or more than a predetermined turn-on angle, the control device outputs a turn-on signal to the additional lamp on a side of the steering direction,
    when the steering angle satisfies a predetermined light-dimming condition, the control device outputs a light dimming signal to the additional lamp that is turned on, and
    when the steering angle is equal to or less than a predetermined forced-complete-turn-off steering-angle, the control device outputs a forced-complete-turn-off signal to the additional lamp that is dimmed,
    wherein the predetermined light-dimming condition includes a condition in which the steering angle is equal to or less than a predetermined light-dimming steering-angle,
    wherein in the condition in which the steering angle is equal to or less than the predetermined light-dimming steering-angle, the predetermined light-dimming steering-angle varies according to a speed of the vehicle, and the faster the speed of the vehicle is, the smaller the predetermined light-dimming steering-angle is.

4. The lighting apparatus according to claim 1, wherein the predetermined turn-on steering-angle varies according to a speed of the vehicle, and the faster the speed of the vehicle is, the smaller the predetermined turn-on steering-angle is.

5. The lighting apparatus according to claim 1, wherein when a plurality of the additional lamps are provided on the left side and the right side of the front of the vehicle, at least one of the predetermined turn-on steering-angle, the predetermined light-dimming condition, and the predetermined forced-complete-turn-off steering-angle is different for each of the additional lamps on the left side and the right side of the front of the vehicle.

6. A lighting apparatus for a vehicle, comprising:
at least one additional lamp provided on a left side of a front of the vehicle;
at least one additional lamp provided on a right side of the front of the vehicle;
a steering-angle sensor that detects a steering angle and a steering direction of a steering wheel, and outputs a steering-angle signal and a steering-direction signal; and
a control device that controls the additional lamps based on the steering-angle signal and the steering-direction signal, wherein when the steering angle is equal to or more than a predetermined turn-on angle, the control device outputs a turn-on signal to the additional lamp on a side of the steering direction, when the steering angle satisfies a predetermined light-dimming condition, the control device outputs a light dimming signal to the additional lamp that is turned on, and when the steering angle is equal to or less than a predetermined forced-complete-turn-off steering-angle, the control device outputs a forced-complete-turn-off signal to the additional lamp that is dimmed, wherein the at least one additional lamp provided on the left side of the front of the vehicle includes a left-side motor, the at least one additional lamp provided on the right side of the front of the vehicle includes a right-side motor, and in a condition in which the steering angle is equal to or more than the predetermined turn-on steering-angle, when the steering wheel is steered in a turning direction, the left-side motor or the right-side motor on a side of the turning direction is driven to rotate the at least one additional lamp on the side of the turning direction from an inner side of the vehicle toward an outer side of the vehicle, and when the steering wheel is steered in a returning direction, the left-side motor or the right-side motor on a side opposite to the returning direction is reversely driven to rotate the at least one additional lamp on the side opposite to the returning direction from the outer side of the vehicle toward the inner side of the vehicle.

\* \* \* \* \*